United States Patent
Linton et al.

(10) Patent No.: US 8,483,606 B2
(45) Date of Patent: Jul. 9, 2013

(54) AUTOMATIC DETERMINATION OF USER ALIGNMENTS AND RECOMMENDATIONS FOR ELECTRONIC RESOURCES

(75) Inventors: Cory John Linton, Draper, UT (US); Chet D. Linton, Sandy, UT (US)

(73) Assignee: School Improvement Network, LLC, Midvale, UT (US)

( * ) Notice: Subject to any disclaimer, the term of this patent is extended or adjusted under 35 U.S.C. 154(b) by 0 days.

(21) Appl. No.: 13/572,914

(22) Filed: Aug. 13, 2012

(65) Prior Publication Data

US 2013/0040277 A1    Feb. 14, 2013

Related U.S. Application Data

(60) Provisional application No. 61/523,144, filed on Aug. 12, 2011, provisional application No. 61/523,163, filed on Aug. 12, 2011.

(51) Int. Cl.
*G09B 3/00* (2006.01)
(52) U.S. Cl.
USPC .......................................... 434/350; 707/748
(58) Field of Classification Search
USPC ...... 434/350, 322; 709/228; 705/11; 707/748
See application file for complete search history.

(56) References Cited

U.S. PATENT DOCUMENTS

| | | | |
|---|---|---|---|
| 6,790,045 B1 | 9/2004 | Drimmer | |
| 2006/0031087 A1* | 2/2006 | Fox et al. | 705/1 |
| 2006/0155558 A1* | 7/2006 | Corpening | 705/1 |
| 2008/0256015 A1 | 10/2008 | Woolf et al. | |
| 2010/0120011 A1 | 5/2010 | O'Brien | |
| 2010/0153404 A1* | 6/2010 | Ghosh et al. | 707/748 |
| 2010/0198659 A1* | 8/2010 | Meltzer et al. | 705/11 |
| 2012/0159337 A1* | 6/2012 | Travilla et al. | 715/738 |

OTHER PUBLICATIONS

International Search Report and Written Opinion for PCT/US12/050140, Nov. 5, 2012, 10 pgs.

* cited by examiner

*Primary Examiner* — Kang Hu
(74) *Attorney, Agent, or Firm* — Patent Law Works LLP

(57) ABSTRACT

Various implementations for automatically determining user alignments and recommendations for electronic resources are described. One example implementation includes an assessment module, an alignment module, and a recommender. The assessment module determines performance levels of two or more users of an educational platform. The alignment module determines an alignment between the two or more users of the educational platform based on the performance levels of the two or more users. The recommender generates a recommendation for a social graph connection between the two or more users in a social graph based on the alignment.

23 Claims, 13 Drawing Sheets

1000

AUTOMATIC DETERMINATION OF USER ALIGNMENTS AND RECOMMENDATIONS FOR ELECTRONIC RESOURCES

CROSS-REFERENCE TO RELATED APPLICATIONS

This application claims the benefit under 35 U.S.C. §119 (e) of U.S. Provisional Application No. 61/523,144, entitled "Assessment Collaboration and Social Networking", filed on Aug. 12, 2011, and U.S. Provisional Application No. 61/523, 163, entitled "Common Core Standards", filed on Aug. 12, 2011, the entire contents of each of which are incorporated herein by reference.

BACKGROUND

1. Technical Field

The present disclosure relates to computing, and more particularly to automatically determining user alignments and recommendations for electronic resources.

2. Description of Related Art

In recent years, some governments have been adopting increasingly rigorous educational standards outlining what students are expected to learn in order to be considered acceptably educated. The educational systems implementing these standards have been imposing requirements related to these standards for their educators to meet. However, these educational systems are often limited in providing educators who are struggling to meet the requirements with the assistance and resources they need to help them improve. For example, while these systems may periodically evaluate the proficiency of their educators relative to these standards, they are often slow to act on any results due to the number of reviews these systems have to process and other bureaucratic hurdles. As a result, an educator who is evaluated as lacking in proficiency may continue to teach for the remainder of a semester or school year without receiving any assistance or resources to improve. Additionally, the resources assigned by these educational systems to help educators develop and improve are often not current or targeted to their educators' specific needs. Consequently, the assistance and resources that educators do receive to help them develop professionally can be ineffective.

Furthermore, some of these educational systems lack a collaborative and supportive social environment that is targeted to the needs of educators to help them develop and improve. For example, an administrator may pair an educator who is underperforming in a given area with a more senior educator for advice or training. However, this is often done without taking the individual needs and circumstances of the educator who is underperforming into account. As a result, the senior educator, while being accomplished in his or her own right, may not have the relevant experience or background necessary to provide the most effective assistance or training necessitated by the needs of the underperforming educator.

SUMMARY

According to one innovative aspect of the subject matter described in this disclosure, a system includes an assessment module, an alignment module, and a recommender. The assessment module determines performance levels of two or more users of an educational platform. The alignment module determines an alignment between the two or more users of the educational platform based on the performance levels of the two or more users. The recommender generates a recommendation for a social graph connection between the two or more users in a social graph based on the alignment.

In general, another innovative aspect of the subject matter described in this disclosure may be embodied in a method that includes determining performance levels of two or more users of an educational platform; determining an alignment between the two or more users of the plurality based on the performance levels of the two or more users; and generating a recommendation for a social graph connection between the two or more users in a social graph of the educational platform based on the alignment.

Other implementations of one or more of these aspects include corresponding systems, apparatus, and computer programs, configured to perform the actions of the methods, encoded on computer storage devices. These and other implementations may each optionally include one or more of the following features.

For instance, the system may further include that the recommender is coupled to receive the alignment from the alignment module or a data store, and the alignment module is coupled to receive the performance levels from the assessment module or a data store; that the alignment module is configured to determine the alignment between the two or more of the users based on an alignment type; that the alignment module is further configured to determine the alignment between the two or more of the users by identifying a first user having a performance level that does not satisfy a standard, and identifying, as a mentor for the first user, a second user having a performance level satisfying the standard; that the alignment module is further configured to determine the alignment between the two or more of the users by identifying, as a learning community, three or more users of the educational platform based on the performance levels of the three or more users and attributes common or compatible between the three or more users; a communication unit for sending and receiving data; a graphing module to define, in a social graph, a social graph connection between each of the two or more users that reflects the alignment; that the recommender is coupled to the communication unit to provide the recommendation to the user for presentation and to receive a recommendation response from the user responsive to the recommendation being provided; an aggregator to aggregate data including one or more of achievement data, profile data, standards data, and assessment data; that the assessment module is configured to determine the performance levels of the two or more users based at least in part on the data; and an analyzer to identify an electronic resource interacted with by the two or more users and to recommend or assign the electronic resource to a user having an attribute compatible or in common with the two or more users.

For instance, the operations may further include identifying a first user having a performance level that does not satisfy a standard; identifying, as a mentor for the first user, a second user having a performance level satisfying the specific criterion; identifying, as a learning community, three or more users of the educational platform based on the performance levels of the three or more users and attributes common or compatible between the three or more users; providing the recommendation to a user for presentation; receiving a recommendation response from the user responsive to the providing of the recommendation; defining, in the social graph, a social graph connection between each of the two or more users responsive to the receiving of the recommendation response; that the social graph connection reflects the alignment; receiving an alignment request from the user; that the determining of the alignment is made responsive to the receiving of the alignment request, and the user is one of the two or more users; aggregating data including one or more of achievement data, profile data, standards data, and assessment data; that the performance levels of the users are determined based at least in part on the data; identifying an electronic resource interacted with by the two or more users; and recommending or assigning the electronic resource to a user having an attribute compatible or in common with the two or more users.

These implementations are particularly advantageous in a number of respects. For instance, they can generate user alignments and electronic resources recommendations that are based on the needs of the users of the educational platform, automatically determine which electronic resources have been effective at helping users improve their proficiency and surface them for recommendation to a user or a user's supervisor, generate a report summarizing and/or recommending resources and user alignments targeted to the needs of a user, determine learning community, colleague, and mentor alignments that are relevant to the users and based on their specific needs, surface resources that have been determined as effective and/or are targeted to the needs of the users of an alignment, and automatically generate connections on a social network based on demographics, assessments, achievements, content interaction, user profiles, and standards, etc. It should be understood, however, that this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Example System

Figure 1:
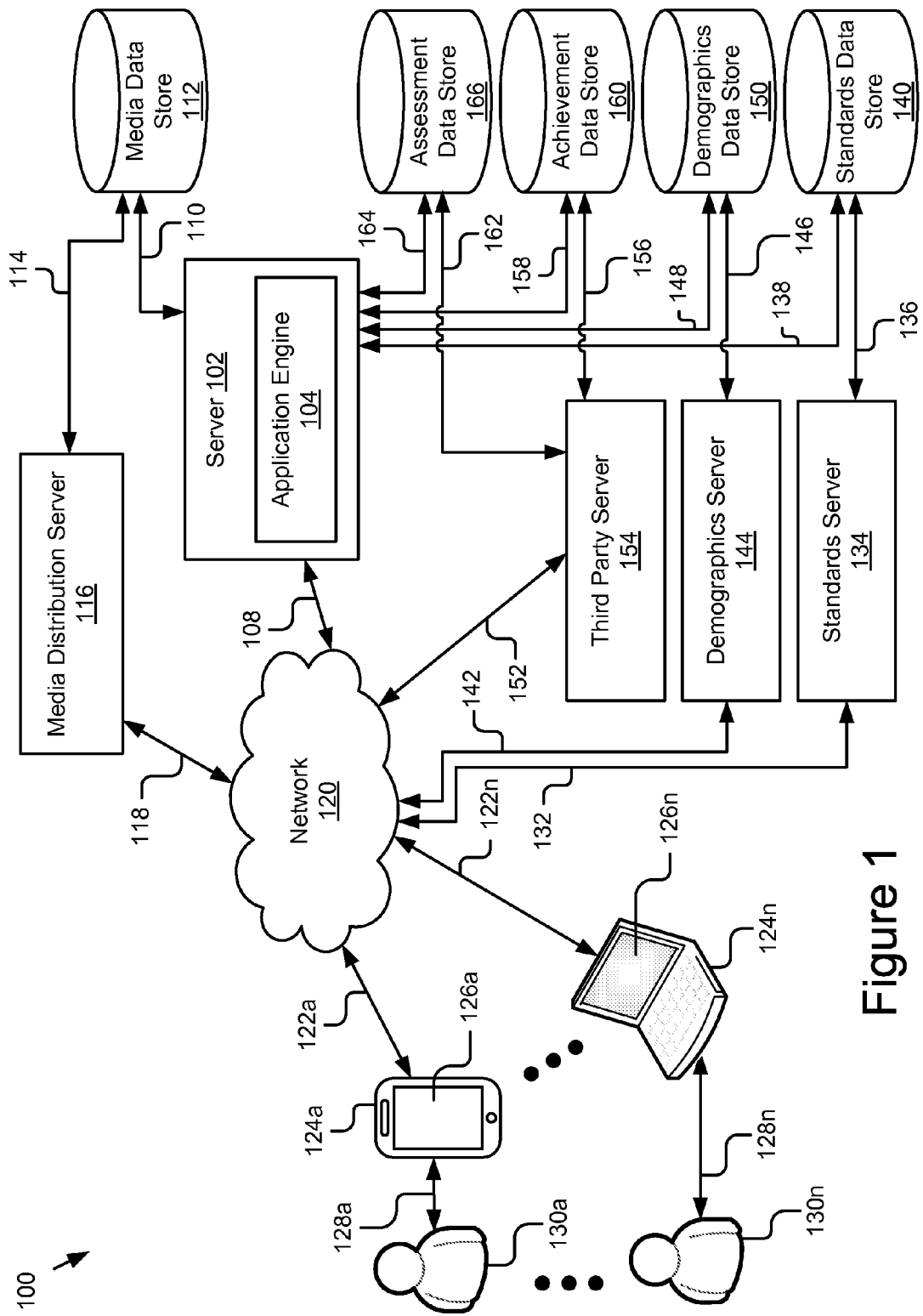
FIG. 1 is a block diagram illustrating an example system for automatically determining user alignments and recommendations for electronic resources.

FIG. 1 is a block diagram illustrating an example system 100 for automatically determining user alignments and recommendations for electronic resources. In the depicted embodiment, the system 100 includes a server 102, a media distribution server 116, client devices 124a . . . 124n (also referred to herein individually and collectively as 124) that are accessed by users 130a . . . 130n (also referred to herein individually and collectively as 130), a third-party server 154, a demographics server 144, and a standards server 134. In the illustrated embodiment, these entities are electronically communicatively coupled via a network 120. While only one network 120 is depicted as coupling the server 102, the media distribution server 116, the client devices 124a . . . 124n, the third-party server 154, the demographics server 144, and the standards server 134, in practice any number of networks 120 can be connected to or interconnect these entities.

The network 120 may include one or more wired or wireless networks, and may provide an interconnected data path across which multiple devices may communicate. The network may have number of configurations or topologies, such as a star configuration, token ring configuration, or other known configurations. For example, the network 120 may include, but is not limited to, a local area network (LAN), a wide area network (WAN) (e.g., the Internet), mobile (cellular) networks including distributed radio networks and a hub providing a wireless wide area network (WWAN), a Bluetooth® communication network, a WiFi™ hotspot, etc. The network 120 may transmit data using a variety of different network communication protocols. Example communication protocols include, but are not limited to, user datagram protocol (UDP), transmission control protocol (TCP), hypertext transfer protocol (HTTP), hypertext transfer protocol secure (HTTPS), file transfer protocol (FTP), direct data connection, various email protocols, etc. Computing device such as client devices 124 and servers 102, 116, 134, 144, and 154 may couple to and communicate via the network 120 using wireless and/or wired connections.

The server 102, the media distribution server 116, the third-party server 154, the demographics server 144, and the standards server 134 may each include one or more processors and one or more storage devices storing data or instructions for execution by the one or more processors. For example, the servers 102, 116, 154, 144, and/or 134 may each include a server, a server array or any other computing device, or group of computing devices, having data processing, storing, and communication capabilities. In another example, the servers 102, 116, 154, 144, and/or 134 may include a virtual server (i.e., a virtual machine) implemented via software. For instance, the virtual server operates in a host server environment and accesses the physical hardware of the host server including, for example, a processor, memory, storage, network interfaces, etc., via an abstraction layer (e.g., a virtual machine manager). It should be understood that the servers 102, 116, 154, 144, and/or 134 may be made up of any combination of devices and servers, or only one device or server. Further, while the servers 102, 116, 154, 144, and 134 are depicted as being distinct computing devices or systems, in other embodiments, one or more of these servers 102, 116, 154, 144, and 134 may be integrated into the same computing device or system.

In some embodiments, the entities of the system 100 including the servers 102, 116, 134, 144, and/or 154 may be implemented using cloud-based architectures where one or more computer functions are performed by remote computing systems and devices at the request of a local computer device. For example, the servers 102, 116, 154, 144, and/or 134 may be a cloud-based distributed computing system having dynamically scalable and virtualizable resources, and various functionalities of the servers 102, 116, 154, 144, and/or 134 may be carried out and supplemented by computing systems and devices distributed over the network 120.

The server 102 includes an application engine 104 for providing an educational platform. The educational platform may provide resources and functionality to its users for educational, developmental, or education management purposes, such as primary and secondary education, post-secondary education, continuing education, professional development, etc. The electronic resources and functionality may be used to teach curriculum to participants, provide functionality to the participants to apply the curriculum practically, teach skills to participants, assist participants in integrating and applying those skills, assess the success of participants in applying the skills, evaluate whether additional learning is needed, assess the overall effectiveness of the participants relative to various standards, and the like.

By way of example, the educational platform may be used by students, teachers, professors, and administrators, health care professionals such as nurses or physicians, legal professionals such as lawyers, judges or trustees, corporate professionals such as officers, directors, managers or other internal corporate employees, travel industry professionals such as pilots, drivers, skippers or the like, financial professionals such as accountants, brokers, traders, tax specialists or the like, human relations professionals, sales professionals, service industry professionals, government employees, law enforcement personnel, military personnel, sports professionals and/or personnel, homeland security personnel, any other workforce that requires professional training and assessment as to the assimilation and effectiveness of such training, or the like.

The third-party server 154, the demographics server 144, and the standards server 134 host network-based software applications operable to provide various services or functionalities to their end-users. In some embodiments, the servers 154, 144, and 134 send data to and receive data from the server 102 and the other entities coupled to the network 120. In the depicted embodiment, the third-party server 154 is coupled to the network 120 via signal line 152 for communication with the other entities of the system 100; the demographics server 144 is coupled to the network 120 via signal line 142 for communication with the other entities of the system 100; and the standards server 134 is coupled to the network 120 via signal line 132 for communication with the other entities of the system 100. Additionally, the third-party server 154 is coupled to the achievement data store 160 and the assessment data store 166 via signal lines 156 and 162, respectively, the demographics server 144 is coupled to the demographics data store 150 via signal line 146, and the standards server 134 is coupled to the standards data store 140 via signal line 136.

In some embodiments, the third-party server 154, the demographics server 144, and the standards server 134 may store and provide access to data that is associated with users of the application engine 104.

In particular, the demographics server 144 may maintain demographics data associated with the users of the application engine 104 and/or the organizations with which they are associated (e.g., work for, attend, belong to, etc.). An organization may be any type of organized entity. For example, the organization may be an academic institution, a partnership, corporation, religious institution, military institution, non-profit organization, governmental body, municipality, or the like. In some instances, sensitive information included in the demographics data is anonymized.

By way of example, the demographics data may describe the ethnicity, race, age, gender, disabilities, mobility, socio-economic status, religious affiliation, language, location, etc. of the users and/or those they administrate, teach, or oversee; the organizational structure of the entities with which the users are associated with, such as an organization's geographic location, size, and make-up; and the changes in demographics that occur over time. As a further example, in an educational setting, the demographics of an educational system describe the system's region, district(s), school(s), grade(s), classroom(s), subject(s), students, teachers, special education needs, free and reduced lunch programs, racial and ethnic makeup of students and teachers, system student achievement historical data, English language learning programs, etc. For instance, the demographics information may include the teachers' education, experience, grade levels taught, subjects taught, specializations, background, residence, areas of excellence or expertise, etc., and the students' grade level, achievement level, socio-economic status, ethnicity/race, spoken language, special needs, dependency on social programs, etc.

The standards server 134 may maintain standards data compiled and approved by a governing body which define requirements, standards, metrics, benchmarks, etc. (hereinafter "standards") that are applicable to users of the system 100. For example, in an educational setting, the standards may establish the levels of attainment pupils much reach to be considered acceptably educated. The governing body may be an organization as described above. For example, in an educational setting, the governing body may be a governmental legislative or administrative body tasked with setting educational standards for primary, secondary, and post-secondary school systems.

The third-party server 154 maintains assessment and achievement data applicable to users of the system 100. In some embodiments, the third-party server 154 maintains this data in association with the online services it provides. For example, the third-party server may provide online services for human resource management, surveying, standardized testing, accreditation, or the like. The third-party server 154 is not limited to providing the above-noted services and may include any other network-based or cloud-based service. For simplicity, a single block for the third-party server 154 is shown. However, in other embodiments, several distinct third-party servers (not shown) may be coupled to the network via distinct signal lines to provide distinct or competing services.

The achievement data may include test scores, grades, or other marks for evaluating the users themselves or those they administrate, teach, or otherwise oversee. For example, in an educational setting, the achievement data may include data describing how the students of teachers achieved relative to applicable educational standards. Additional examples of achievement data include, but are not limited to college admission test data (e.g., ACT, SAT, etc.), advanced placement (AP) test data, state standardized test data, federal standardized test data, grades, etc.

The assessment data may include formal and informal assessments of the users. In an educational setting, for example, the assessment data may include formal evaluations, informal evaluations, formative assessments, summative assessments, student reviews of teachers and/or administrators, observations, peer reviews, parent reviews, inter-rater reliability data, etc. In a further example, the assessment data for a given teacher may include formal and informal evaluations performed by an administrator, supervisor, or human resources representative, formative assessments of teaching performance, student reviews, peer reviews, mentor or coach reviews, etc. The achievement data and assessment data may be segmented by various criteria including, for example, district, school, administrator, teacher, subject, student, etc.

In the depicted embodiment, the servers 134, 144, and 154 respectively maintain their data in the data stores 140, 150, and 160 and 166, which are information sources for storing data and providing access to stored data. In some embodiments, the data stores 112, 140, 150, and 160 and 166 are respectively included in the memories of the servers 116 and/or 102, 134, 144, and 154. In other embodiments, the data stores 112, 140, 150, and 160 and 166 are each included in a server or storage system distinct from but respectively accessible by the servers 116 and/or 102, 134, 144, and 154. For example, one or more of the data stores 112, 140, 150, 160, and 166 may be storage systems distributed over the network 120, such as an intranet or the Internet. Further, while the data stores 112, 140, 150, 160, and 166 are depicted in FIG. 1 as distinct entities, in other embodiments, one or more of these data store 112, 140, 150, 160, and 166 may be integrated into the same storage devices or systems, or further segmented into additional storage devices or systems.

In some embodiments, the servers 134, 144, and 154 can respectively provide the server 102 access to data stored in the data stores 140, 150, and 160 and 166. For example, these servers 134, 144, and 154, may provide secure access to data respectively stored in the data stores 140, 150, and 160 and 166 over the network 120 via APIs. In other embodiments, the server 102 is directly coupled to the data stores 140, 150, 160, and 166 via signal lines 138, 148, 158, and 164, respectively, to access (e.g., store, modify, and retrieve) the data stored therein. The third-party server 154, the demographics server 144, and the standards server 134 may require system 100 entities to be registered and authenticate in order to access the data maintained by them.

In some embodiments, one or more of the data stores 112, 140, 150, 160, and 166 may include a database management system (DBMS) executable by a processor to manage a collection of records, files, and objects including the media objects. For example, the data stores 112, 140, 150, 160, and 166 may include a structured query language (SQL) DBMS for storing data in multi-dimensional tables having rows and columns, and manipulate, i.e., insert, query, update and/or delete, rows of data using programmatic operations (e.g., SQL).

The client devices 124a . . . 124n are computing devices having data processing and data communication capabilities. In various embodiments, the client devices 124 may include one or more of wired or wireless network interfaces for sending and receiving network data; a graphics processor; a high-resolution touchscreen or monitor; a physical keyboard; forward and rear facing cameras; sensors such as accelerometers and/or gyroscopes; a GPS receiver; a Bluetooth® module; memory storing applicable firmware; various physical connection interfaces (e.g., USB, HDMI, headset jack, etc.); etc. Additionally, an operating system for managing the hardware and resources of the client device 124, application programming interfaces (APIs) for providing applications access to the hardware and resources, a user interface module for generating and displaying interfaces for user interaction and input, and applications such as applications for making phone calls, video calls, web browsing, messaging, playing-back multimedia, social networking, gaming, capturing digital video and/or images, etc., may be stored in a memory and operable by a processor of the client device 124. The client devices 124a . . . 124n may be computing devices of the same type or of different types. For example, the client device 124 may be a desktop computer, a laptop, or a handheld wireless device, which is capable of sending and receiving voice and/or data communications.

In the depicted embodiment, the client device 124a is coupled to the network 120 via signal line 122a and the user 130a interacts with the client device 124a as depicted by line 128a, and the client device 124n is coupled to the network 120 via signal line 122n and the user 130n interacts with the client device 124n as depicted by line 128n. While FIG. 1 illustrates two or more client devices 124, the present disclosure applies to any system architecture having one or more client devices. The client devices 124a and 124n, as depicted, respectively contain instances 126a and 126n of a client application 126. These instances 126a and 126n are also collectively and independently referred to herein as the client application 126. In some embodiments, these instances 126a and 126n reflect the same client application 126. In other embodiments, these instances 126a and 126n may be distinct from one another in compilation but can provide similar functionality to the end-user.

The client application 126 may be stored in a memory (not shown) of a user device 124 and accessible and executable by a processor (not shown) to render user interfaces, receive user input, and process data, and send data to and receive data from the application engine 104. In some embodiments, the client application 126 generates and presents user interfaces to a user 130 via a display (not shown). For example, the client application 126 may generate and present the user interface 1100 depicted in FIG. 11 based at least in part on information received from the application engine 104 via the network 120. In some embodiments, the client application 126 is code operable in a browser launched on the user device 124, the browser receives interface instructions from the application engine 104 of the server 102 via the network 120 in the form of a mark-up language (e.g., HTML, XML, etc.), style sheets (e.g., CSS, XSL, etc.), graphics, and/or scripts (e.g., JavaScript, ActionScript, etc.), and the browser interprets the interface instructions and renders an interactive Web User Interface (WUI) for display on the user device 124 based thereon. In other embodiments, some or all of the interface instructions are provided by the client application 126, or by another locally or remotely operated application that specifies that the content be formatted and displayed according to an organization's specific needs and/or standards. Other variations are also contemplated and within the scope of this disclosure. The client application 126 is also operable to receive input signals from the user 130 via an input device (not shown) of the user device 124, and to send information to the application engine 104 via a communication unit (not shown) coupled to the network 120, such as one like or substantially similar to the communication unit 212.

Example Server 102

Figure 2A:
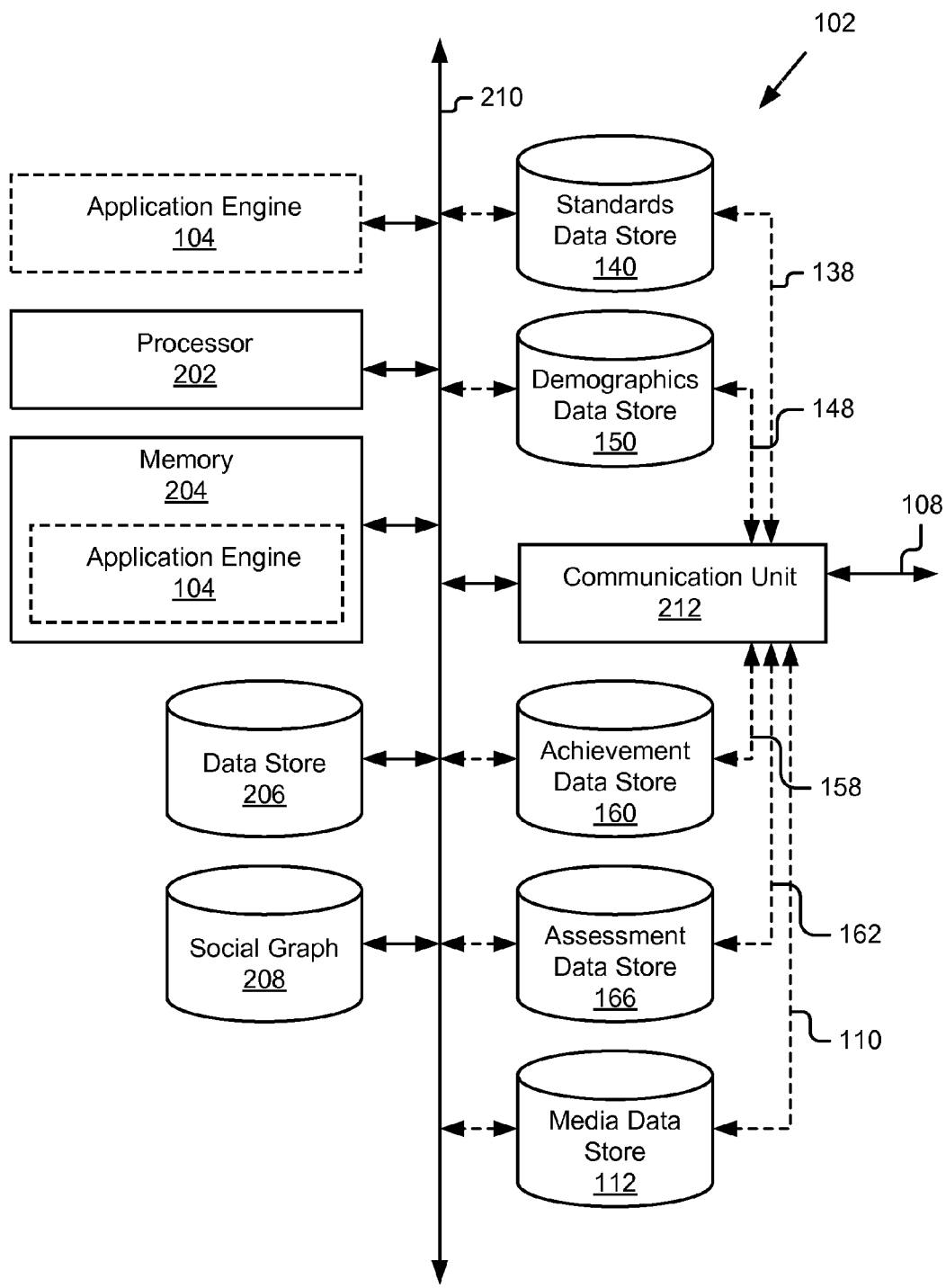
FIGS. 2A-B are block diagrams illustrating an example server.

FIG. 2A is a block diagram of an example server 102. In the depicted embodiment, the server 102 includes one or more computing devices having a processor 202, a memory 204, a communication unit 212, a data store 206, and a social graph 208, which are communicatively coupled via a communication bus 210. The server 102 also includes an application engine 104. The communication bus 210 can be any type of conventional communication bus for transferring data between components of a computing device, or between computing devices.

In some embodiments, one or more of the data stores 140, 150, 160, 166, and 112 may also be included in and coupled to the bus 210. For example, the data stores 140, 150, 160, 166, and 112 may be local instances of the data stores 140, 150, 160, 166, and 112 depicted in FIG. 1, and the server 102 may update these local instances at regular intervals (e.g., using a batch process) to reflect the data stored and maintained remotely. In other embodiments, the server 102 may aggregate data from the remote data stores 140, 150, 160, 166, and 112 and store it in the data store 206. In yet other embodiments, the server 102 may access data stored by the remote data stores 140, 150, 160, 166, and 112 via the network 120 real-time. It should be understood that these embodiments are provided by way of example, and other configurations are contemplated and fall within the scope of this disclosure. Moreover, the server 102 depicted in FIG. 2A is provided by way of example and it should be understood that the server 102 may take other forms and include additional or fewer components without departing from the scope of the present disclosure. For example, some or all of the data stores depicted in FIG. 2A may be consolidated into a single data store, or further divided into additional data stores without departing from the scope of the present disclosure. In another example, while not shown, the server 102 may include other components, such as an operating system, and input and output devices (e.g., a computer display, a keyboard and mouse, etc.), etc. In some embodiments, the computer architecture depicted in FIG. 2 may be applicable to the other entities of the system 100, such as the servers 134, 144, and 154.

The processor 202 includes an arithmetic logic unit, a microprocessor, a general purpose controller, or some other processor array to perform computations and provide electronic display signals to a display device (not shown). The processor 202 may be coupled to the bus 210 for communication with the other components of the server 102. The processor 202 may process data signals and may have various computing architectures including a complex instruction set computer (CISC) architecture, a reduced instruction set computer (RISC) architecture, or an architecture implementing a combination of instruction sets. Although only a single processor 202 is shown in FIG. 2A, multiple processors may be included. The processor 202 may be capable of supporting the display of images and the capture and transmission of images, perform complex tasks, including various types of feature extraction and sampling, etc. It should be understood that the server 102 may include various operating systems, sensors, displays, additional processors, and other physical configurations.

The memory 204 stores instructions and/or data that may be executed by the processor 202. The memory 204 is coupled to the bus 210 for communication with the processor 202 and the other components of server 102. The instructions and/or data may comprise code for performing any and/or all of the techniques described herein. For example, the memory 204 may store the application engine 104, an operating system, drivers, and various other software. The memory 204 may include a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. A non-transitory computer-usable storage medium may include any and/or all computer-usable storage media. In some embodiments, the memory 204 may include volatile memory, non-volatile memory, or both. For example, the memory 204 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing information on a more permanent basis. It should be understood that the memory 204 may be a single device or may include multiple types of devices and configurations.

The communication unit 212 is an interface for sending data to and receiving data from other computing devices. In the depicted embodiment, the communication unit 212 is coupled to the network 120 by the signal line 108. The communication unit 212 may also be coupled to the media data store 112 via signal line 110, coupled to the data stores 140, 150, 160, and 166 via signal lines 138, 148, 158, 164, and coupled to the bus 210. In some embodiments, the communication unit 212 includes a network interface device (I/F) for wireless or wired connectivity to the network 120. For example, the communication unit 212 may include a wireless transceiver, a CAT-5 interface, USB interface, or SD interface, etc. The communication unit 212 may, in some embodiments, send and receive signals via the network 120 using Wi-Fi™, Bluetooth®, or various cellular protocols. The communication unit 212 can link the processor 202 to the network 120 that may in turn be coupled to other processing systems. The communication unit 212 can provide connections to the network 120 and to other entities of the system 100 using various communication protocols including, for example, those discussed above with reference to the network 120.

Example Application Engine 104

Figure 2B:
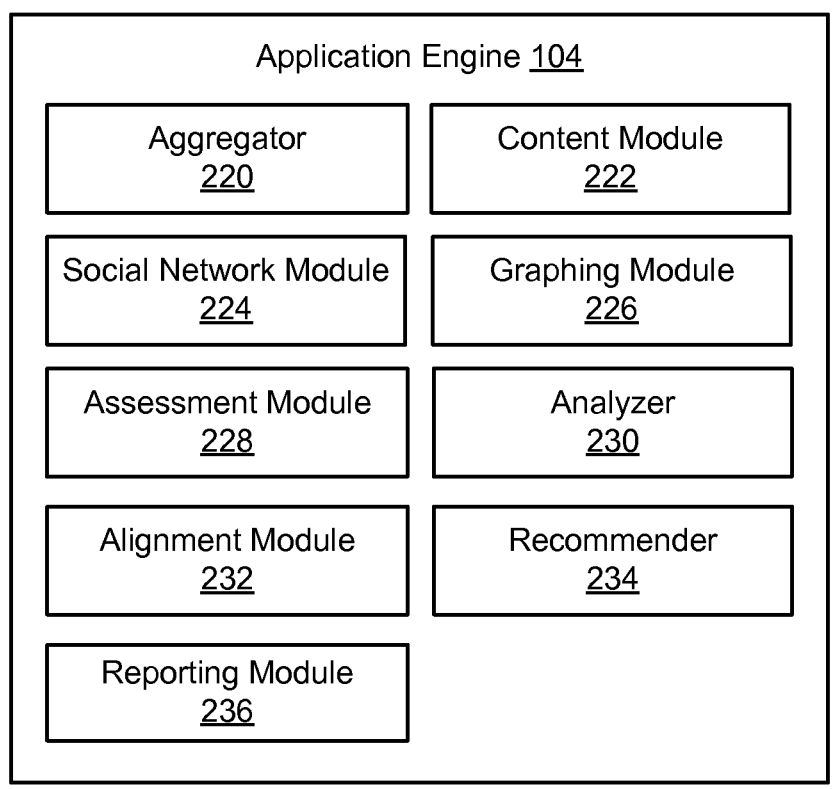

In the depicted embodiment, the server 102 includes an application engine 104, which is software, code, logic, or routines for providing the educational platform. As depicted in FIG. 2B, the application engine 104 may include, among other modules, an aggregator 220, a content module 222, a social network module 224, a graphing module 226, an assessment module 228, an analyzer 230, an alignment module 232, a recommender 234, and a reporting module 236. In other embodiments, one or more of these modules 220, 222, 224, 226, 228, 230, 232, 234, and 236 may be integrated into a single module or divided into additional modules.

In various embodiments, the application engine 104 and its sub-components 220, 222, 224, 226, 228, 230, 232, 234, and 236 may be sets of instructions executable by the processor 202, or logic included in one or more customized processors (e.g., specific integrated circuits (ASICs)), to provide their respective functionalities; or may be stored in the memory 204 (e.g., RAM, PROM, FPROM, ROM, etc.) of the server 102 and are accessible and executable by the processor 202 to provide their respective functionalities. In any of these embodiments, the application engine 104 and its components 220, 222, 224, 226, 228, 230, 232, 234, and 236 may be adapted for cooperation and communication with the processor 202 and other components of the server 102.

The aggregator 220 is software, code, logic, or routines for aggregating data from various information sources that can be used for generating user alignments, content recommendations, analytics, reports, and the like. The aggregator 220 may aggregate, via the communication unit 212, the data from various information sources coupled to the network 120 (e.g., 134, 140, 144, 150, 154, 166, etc.) and store it locally in one or more data stores. In some embodiments, the aggregator 220 replicates the data stored in remote instances of data stores 140, 150, 160, 166, and 112 in local instances of those data stores. In other embodiments, the aggregator 220 can store the data aggregated from the remote sources in the data store 206. In yet other embodiments, some or all of the data aggregation can be omitted by incorporating one or more of the data stores 140, 150, 160, 166, and 112 into the server 102.

In some embodiments, the aggregator 220 may aggregate the data at regular intervals. For example, a batch program operating periodically (every few minutes, hours, days, weeks, etc.) may replicate the data stored in data stores 140, 150, 160, and 166 to one or more data stores of the server 102. In other embodiments, the aggregator 220 may retrieve data real-time.

Data aggregated or generated by the aggregator 220 and the other modules of the application engine 104, including, for example, content module 222, the social network module 224, the graphing module 226, the assessment module 228, the analyzer 230, the alignment module 232, the recommender 234, and the reporting module 236, is collectively referred to as aggregated data. For example, aggregated data may include, but is not limited to, demographics data, content data, interaction data, standards data, achievement data, assessment data, and profile data.

The content module 222 is software, code, logic, or routines for providing electronic resources to the users of the application engine 104. The users may be registered or unregistered users. In some embodiments, the content module 222 can provide content that serves as a gateway portal for the users and provides them an entry point upon logging into the server 102 via their respective client devices 124 to access the various information and resources provided by the application engine 104. The content module 222 can also provide a catalog of electronic resources available to the users, provide for the addition or removal of electronic resources, transmit the electronic resources to the users of the service for consumption, and log user interaction with the electronic resources.

In addition to its plain and ordinary meaning, an electronic resource may include any electronic media for conveying information. An electronic resource can include one or more of textual data, graphical data, video data, audio data, etc. For example, the electronic resource may include a dataset that includes text, graphics, video, and/or audio, or any combination thereof, etc., embedded therein. As a further example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc.

The electronic resources may embody various tools included in the educational platform, such as, but not limited to, educational resources, publications, reference texts, online courses, lesson plans, planning tools, community forums, sharing tools, curriculum mapping tools, an industry standards viewer, portfolio tools, progress monitoring tools, reporting tools, etc. The users of the application engine 104 may access these electronic resources for a number of purposes including, but not limited to, developing personally or professionally, collaborating with other users, receiving recommendations for alignments with other users or recommendations for specific electronic resources, completing coursework, receiving feedback from supervisors, accessing reports tracking their progress and/or the progress of their pupils or subordinates, developing lesson plans, and the like.

The electronic resources may be stored and accessed remotely, locally, or a combination of both. For example, in some embodiments, the media data store 112 may store and provide access to electronic resources that include media objects, such as video, audio, vector-based files, electronic books, etc. In this example, the content module 222 may be coupled to the media data store 112, either directly or via the media distribution server 116, to access electronic resources stored therein, and may be coupled to retrieve data from the data store 206 to access the resources stored therein. In other embodiments, some or all of the electronic resources may all be stored in the data store 206 or another data store and the content module 222 may be coupled to access the resources from the data store 206.

The content module 222 is capable of receiving requests for electronic resources from users 130 and fulfilling those requests by transmitting instances of the electronic resources to the corresponding client devices 124 of the users 130 or facilitating the transmission of instances of the resources by the media distribution server 116 (e.g., by providing an object or code (e.g., a media player object) to the client device 124 that is operable to access the resources via the media distribution server 116). The content module 222 can also receive (e.g., from a client device of a user) a new electronic resource along with metadata for it and store it in the media data store 112 or the data store 206, delete or inactivate an electronic resource stored in the media data store 112 or the data store 206, and update a resource library database, either periodically or real-time, with any new electronic resources that have been added to, inactivated, or removed from the service.

When users consume or interact with the electronic resources provided by the content module 222, the content module 222 is capable of logging the consumption and interaction in the data store 206 in association with those users. In some embodiments, the content module 222 may cooperate with the client application 126 to log any user interactions with the electronic resources. For example, when user interacts with a user interface generated and displayed by the client application 126, the client application 126 may send interaction data via the network 120 to the content module 222. Additionally or alternatively, the content module 222 may receive interaction data from the media distribution server 116. The interaction data may include, but is not limited to, the identity of the electronic resource that was interacted with, the identity of the user, the time and date of the interactions, the actions the user took (e.g., selected or hovered over a user interface element, such as a hyperlink, menu element, input field, pause button, play button, scrubbing dial, volume dial etc.; maximized the viewing field; added a comment; paged through the resource; downloaded a file; completed a survey; viewed an embedded video; shared a resource with social network connections), etc.

The social network module 224 is software, code, logic, or routines for providing social network functionality to the users 130 of the educational platform. In some embodiments, the social network module 224 provides functionality for users to post content to their content streams for consumption by other users, receive messages, collaborate with other users, post content to the content streams of other users, add or remove users from their social graph, participate in learning communities with other users, receive or provide mentoring, recommend or share electronic resources, etc.

In some embodiments, the social networking features provided by the social network module 224 are integrated with the tools embodied by the electronic resources provided by the educational platform. This provides users the ability to collaborate and interact with one another on the electronic resources, thereby driving user learning and implementation. For example, in an educational setting, users may use the social networking module 224 to share, discuss, and collaborate on lesson plans, curriculum maps, coursework, school improvement plans, personal, district, or school goals, documents, training videos or podcasts, or any other electronic resources. In a further example, a group of users may be connected in the social graph 208 as a learning community, and may use a community forum provided by the social network module 224 to interact, discuss, support, and collaborate with one another about various topics, electronic resources, etc. The community forum may also facilitate face-to-face meetings for the users to further their interaction and collaboration. In another example, video of a skilled teacher may be captured in a classroom setting demonstrating various effective teaching techniques related to one or more educational standards. This video may be uploaded to the server 102 and shared via the social network module 224 with struggling teachers who are connected in the social graph 208 to the skilled teacher based on the standards and their performance levels relative to the standards.

In some embodiments, to provide its functionality, the social network module 224 may access mapping information (also referred to herein as a social graph) stored in the social graph 208, which maps how all users 130 of the application engine 104 are connected. A given user's social graph may include attributes that relate to or describe the user, as well as the other users that the user is connected to, and the attributes those connections are based on. In some embodiments, social graph connections between users are based on compatible or common attributes. An attribute may include, but are not limited to, profile, demographic, assessment, performance, standards-related, content interaction, biographical, professional, and/or educational attributes.

For example, in an educational setting, users may be connected in the social graph 208 using demographics data, assessment data, achievement data, standards data, profile data, interaction data, or any other data type described herein or aspect thereof. For instance, educators of a school system located in a particular geographic area (e.g., a state) may be connected in the social graph 208 based on their location; school district; school; subject matter taught; grade-level taught; education; experience; ethnicity; calculated performance; assessed performance; student achievement; standards; background; interests; preferences; consumption of electronic resources; interactions with electronic resources; submitted content; demographics of their students (e.g., whether they have students with disabilities; on social welfare programs; who speak English as a second language, are of a particular race, etc.); etc. It should be understood that any attribute or combination of attributes derived from the various types of data aggregated by the application engine 104 (e.g., the content module 222, the aggregator 220, the assessment module 228, etc.) may be used to connect users in the social graph 208.

Connections in the social graph 208 may be defined implicitly or explicitly. In some embodiments, users are connected implicitly/passively/automatically by the application engine 104 based on the data stored in the various data stores 206, 140, 150, 160, and 166, as discussed elsewhere herein. In other embodiments, the application engine 104 may suggest user alignments, and upon acceptance of those suggestions, the application engine 104 may define the social graph connections in the social graph 208 to reflect the user alignments, as discussed elsewhere herein. In yet other embodiments, users 130 may explicitly add users to their social graphs using an add user function provided by the social network module 224 in cooperation with the client application 126. For example, users 130 who met at a math conference may add one another to their respective social graphs by using an add user dialog displayed by the client application 126. In some embodiments, to add, remove, or modify social graph connections, the social network module 224 can interact with the graphing module 226, for example, by signaling it to perform the foregoing action. In other embodiments, the functionality of the graphing module 226 may be integrated with the social network module 224, and the social network module 224 may interact directly with the social graph 208 to add, remove, or modify social graph connections.

The graphing module 226 is software, code, logic, or routines for creating, modifying, or deleting social graph connections in the social graph 208 between two or more users 130 of the system 100. In some embodiments, the graphing module 226 is coupled to the alignment module 232 or the social network module 224 to receive signals directing it to create social graph connections in the social graph 208. In some embodiments, social graph connections may be based on user alignments identified by the alignment module 232 and recommended by the recommender 234, as discussed elsewhere herein. In other embodiments, the graphing module 226 defines social graph connections based on relationships defined by a user or automatically identified by the alignment module 232 during a batch process analysis of the aggregated data. In yet other embodiments, the graphing module 226 receives instructions to create, modify, or delete social graph connections from the social network module 224. It should be understood that these embodiments are provided by way of illustration and other variations are contemplated.

The assessment module 228 is software, code, logic, or routines for assessing the performance levels of one or more users 130 of the system 100. In addition to its plain and ordinary meaning, assessing a user's performance level may include qualitatively or quantitatively assessing a user's compliance, effectiveness, achievement, attainment, efficacy, perceptions, attitudes, etc., relative to one or more standards, such as those included in the standards data stored in the data store 206 and/or the standards data store 140.

A performance assessment may reflect, relative to one or more criteria (e.g., standards), a user's current performance level, a performance level trend over a particular time period, a past performance level, a cumulative performance level, a specific performance level, an overall performance level, etc., (hereinafter referred to as performance level). The performance assessments may be formal or informal and may measure perceptions and attitudes in addition to standards. For example, a performance assessment performed by the assessment module 228 may reflect a formal annual evaluation submitted to an human resources department or informal assessment of a user conducted to provide the user with feedback on the state of his or her development. In various embodiments, the assessment module 228 can, in cooperation with the client application 126 provide functionality for an observer (e.g., evaluator, reviewer, etc.) to input observational assessments and the assessment module 228 may receive those observational assessments and determine performance levels based thereon.

The assessment module 228 can analyze various data stored by the server 102 to assess the performance levels of users. In some embodiments, the assessment module 228 can analyze one or more of demographics data, content data, interaction data, standards data, assessment data, achievement data, perceptions and attitudes data, and/or profile data to perform the assessments. The assessment module 228 may be coupled to the data stores 206, 208, 140, 150, 160, and/or 166 to access this data. In an educational setting, the assessment module 228 may, for example, analyze achievement data of the students of one or more teacher(s) relative to one or more standards included in the standards data to determine the performance of the teacher(s). In another example, the assessment module 228 may determine, relative to one or more standards included in the standards data, the performance level of the teacher based on a combination of the assessment data related to the teacher and the achievement data of the teacher's students, which may reflect how the students are performing on various standardized tests. Like all examples discussed herein, these examples are provided by way of example and are non-limiting. In other embodiments, the assessment data, as aggregated, may already reflect performance levels for some or all users 130, and determination of performance levels for those users 130 by the assessment module 228 is unnecessary.

The assessment module 228 may store the performance assessments/levels as assessment data in the data store 206 and/or assessment data store 166 in association with the users to which they correspond. In some embodiments, the assessment module 228 may automatically periodically (e.g., at regular intervals) assess the performance levels of all registered users of the application engine 104 and store the assessments as assessment data in the data store 206 and/or assessment data store 166 as assessment data in association with the users.

In some embodiments, assessment data may be provided by the assessment module 228 to the other components of the application engine 104, such as the analyzer 230, the alignment module 232, the recommender 234, the graphing module 226, the reporting module 236, for use by those components to perform their respective operations. In other embodiments, these components may access the assessment data directly from a data store, such as the data store 206 or the assessment data store 166.

The analyzer 230 is software, code, logic, or routines for analyzing interaction data to identify electronic resources that have been interacted by various users 130 and determining whether those electronic resources are effective. In some embodiments, the analyzer 230 may identify a group of two or more users 130 who have interacted with various electronic resources, and may identify the effectiveness of those resources based on the users' performance levels.

The analyzer 230 may query the social graph 208 or another data store to identify these users. In some embodiments, the analyzer 230 may use one or more attributes of a target user to identify other related users. For example, if a user 130 submits a request to application engine 104 requesting a recommendation for an electronic resource, the analyzer 230 may identify the other users based on an attribute of the requestor/user 130. The one or more attributes may be provided to the analyzer 230 by another component of the application engine 104, may be pre-determined, or may be self-determined by the analyzer 230. The analyzer 230 can select from and/or sort the resources it identifies based on one or more criteria. Examples of a criterion may include, but are not limited to, the level of user interaction with a resource (e.g., views, plays, comments, shares, recommendations, bookmarks, downloads, etc.), the overall popularity of a resource, the topics of popular resources, the effectiveness of a resource, the number of users connected to the target user who have interacted with the resource, the number of users who share one or more common or compatible attributes with the target user and have interacted with the resource, relevance of a resource to the user (e.g., a subject taught by the user), a combination of the foregoing, etc.

In some embodiments, the analyzer 230 may determine the effectiveness of the resources based on the performance levels of the users as reflected by the assessment data. For example, users 130 of the application engine 104 may interact with electronic resources provided by the content module 222 to complete various assignments, educate themselves on various topics, improve various skills, socially interact with others in their social network (e.g., colleagues, mentors, etc.), and so forth. Based on the users' performance levels, the analyzer 230 can analyze how the users were performing before and after their interaction with the electronic resources to determine whether they have improved. The analyzer 230 may determine the effectiveness of the resources based on the level and/or pervasiveness of the users' improvements. For example, if a majority of users who, at a particular point in time, were deficient, as reflected by the assessment data, relative to a particular standard, such as maintaining order in their classrooms, consumed an online video directed to effective classroom management and were later determined to be proficient relative to that standard, as reflected by the assessment data, the analyzer 230 can determine that video (i.e., electronic resource) to be highly effective. Conversely, continuing this example, if relatively few or none of the users were found to have improved, the analyzer 230 can determine that video (i.e., electronic resource) to be ineffective.

The analyzer 230 may be coupled directly to the assessment module 228 to retrieve assessment data (e.g., performance levels) for the users or may interact with the assessment data store 166 and/or data store 206 to retrieve this information. The analyzer 230 provides numerous advantages including, but not limited to, surfacing electronic resources that are the most effective for developing skills and knowledge in various areas so they can be recommended for consumption by the users 130 of the application engine 104 who stand in need of development in those areas.

The alignment module 232 is software, code, logic, or routines for determining an alignment between two or more users 130 of the system 100. An alignment between users may include connecting two or more users based on one or more compatibility matches. Users may be matched as compatible based on one or more common or compatible attributes, as reflected by the aggregated data (e.g., demographics data, content data, interaction data, standards data, assessment data, achievement data, profile data, etc.). The alignment module 232 may access the aggregated data from the data stores 206, 208, 140, 150, 160, and/or 166, or may receive it directly from the other modules of the application engine 104. Non-limiting examples of user alignments include colleague alignments, mentor alignments, learning community alignments, etc. These examples are discussed in further detail herein with reference to at least FIGS. 5A-B.

In some embodiments, the alignment module 232 may generate a user alignment responsive to receiving a signal for such from another component of the application engine 104, such as the social network module 224, the recommender 234, or the reporting module 236, and the alignment module 232 may generate the user alignment and then provide it to the component requesting it. In other embodiments, the alignment module 232 may automatically determine user alignments. For example, the alignment module 232 may operate as a batch process at periodic intervals (e.g., hourly, daily, weekly, etc.) and analyze the aggregated for user alignments.

In some embodiments, the alignment module 232 may store the user alignments it generates in a data store, such as the data store 206, and retrieve and provide them upon request. For example, the alignment module 232 may automatically generate user alignments ahead of time and then provide them to the recommender 234 or the reporting module 236 upon request. In other embodiments, the alignment module 232 may proceed to create social graph connections based on the user alignments it generates via the graphing module 226 or the social network module 224. In yet other embodiments, the alignment module 232 may include the functionality of the graphing module 226 and may define the social graph connections in the social graph 208 directly.

The recommender 234 is software, code, logic, or routines for generating recommendations for the electronic resources and social graph connections to the users 130 of the system 100.

To generate a recommendation for one or more electronic resources, the recommender 234 may, in some embodiments, signal the analyzer 230 to identify one or more resources to recommend. In other embodiments, the analyzer 230 may automatically identify these resources at various intervals, for example, via a batch process. In yet other embodiments, another component of the application engine 104, such as the content module 222, the reporting module 236, or a request handler (not shown), may signal the analyzer 230 to identify the one or more resources. Upon identifying the resources, the analyzer 230 may provide data describing the resources directly to the recommender 234 or may store the data in a data store, such as the data store 206, for retrieval by the recommender 234.

To generate a recommendation for a social graph connection, the recommender 234 may, in some embodiments, signal the user alignment module 232 to generate a user alignment and provide it for use in generating the recommendation. In other embodiments, the alignment module 232 may automatically generate the user alignment (e.g., at various intervals via a batch process), and may provide it to the recommender 234 upon request. In yet other embodiments, another component of the application engine 104 may signal the alignment module 232 to generate the user alignment, such as the content module 222, the reporting module 236, or a request handler (not shown), may signal the alignment module 232 to generate the user alignment, and the alignment module 232 may generate and provide it to recommender 234 responsive thereto. Upon generating the user alignment, the alignment module 232 may provide the user alignment directly to the recommender 234 or may store the user alignments in a data store, such as the data store 206 or the social graph 208, for retrieval by the recommender 234.

The recommender 234 is coupled to the data stores 206, 208, 140, 150, 160, and/or 166 to access, store, or otherwise manipulate data stored therein. In some embodiments, the recommender 234 can store the recommendations it generates in a data store, such as the data store 206, for later retrieval. Additionally or alternatively, the recommender 234 may provide the recommendations it generates for presentation to users for which they are designated. In some embodiments, the recommender 234 may provide the recommendations by transmitting them to the client devices 124 of the users 130 via the communication unit 212 and the network 120. By way of example, the recommendations may be integrated or provided asynchronously with the content provided to the users by the content module 222, may be sent directly to users via electronic message (e.g., email, text message, instant message, etc.), may be integrated in reports generated by the reporting module 236 and provided to the users, etc.

The reporting module 236 is software, code, logic, or routines for generating and sending reports to the users of the application engine 104. In some embodiments, the reports are rich, informative reports describing the effectiveness of a user, organization, or electronic resource (e.g., an administrator, teacher, student, educational system, district, school, instructional resource, etc.) relative to various standards, which are generated based on assessment data (e.g., teacher and student), achievement data (e.g., teacher and student), demographics data, inter-rater reliability data, profile data, social graph data, content data, interaction data, standards data, or any other data generated or aggregated by the application engine 104 or the components thereof.

An example report may describe the overall effectiveness of the users who report to an administrator, the effectiveness of the resources they have been consuming, may suggest more effective resources for assignment and consumption by underperforming users, may suggest user alignments to facilitate collaboration between underperforming users and exemplary users (e.g., mentors), may suggest learning communities for the users to facilitate collaboration between and engagement among the users, as well as effective electronic resources for the members of those communities to consume and collaborate on, based on their needs, may segment the users based on demographics, compare different types of data to surface effectiveness indicia that may otherwise not be discernible from the analysis of a single type of data, etc.

Figure 11:
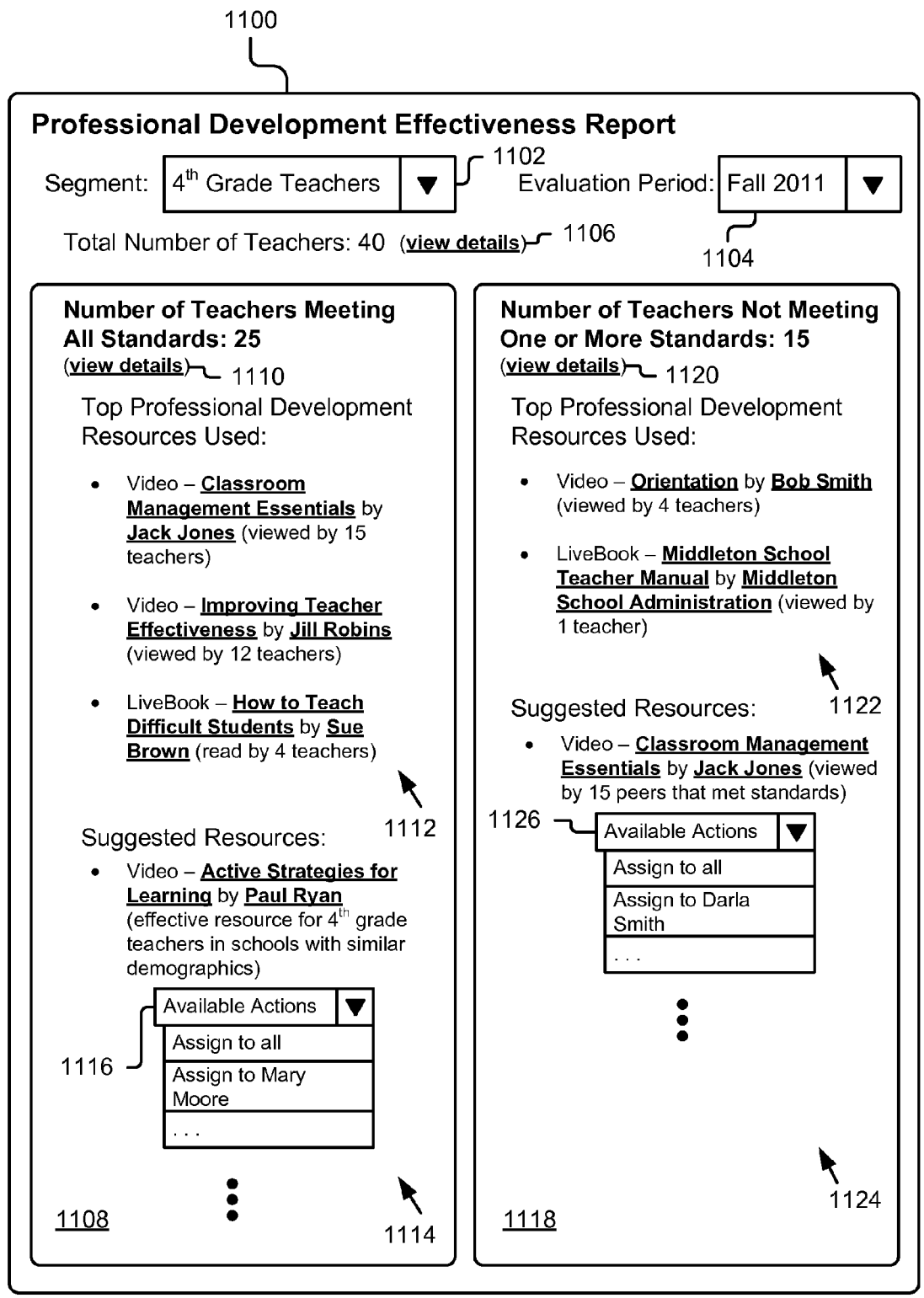
FIG. 11 is a graphical representation of an example report.

Another example report may be tailored to a specific user and that user's effectiveness and needs. This report may recommend user alignments and electronic resources, as determined by the recommender 234 in cooperation with the other components of the server 102. For instance, the report may recommend a mentor for the user, learning communities for the user to participate in, colleagues who teach the same subject, have the same student mix, or have other attributes in common with the user, for the user to connect with, recommend electronic resources for the user to consume based on that user's needs, summarize social network activity related to the user, summarize a user's electronic resource assignments, etc. FIG. 11 depicts an additional non-limiting example of a report that may be generated by the reporting module 236, which is described in further detail below.

In some embodiments, the reporting module 236 can generate and provide a report responsive to receiving a request for such from a client device 124. In other embodiments, the reporting module 236 may automatically generate the report at certain intervals, times, etc. For example, the reporting module 236 may automatically generate reports for all outstanding assignments and send them to the administrator users 130 who oversee the target subjects that the outstanding assignments correspond to. In some embodiments, the reporting module 236 may provide the report to one or more users 130 (e.g., a target user, an administrator, a supervisor, a reviewer, etc.) by transmitting it as a webpage, a portable document, in an electronic message (e.g., email, text message, instant message, etc.).

The reporting module 236 may be coupled to the various data stores 206, 208, 140, 150, 160, 166, and 112, of the system 100 and/or the server 102 to retrieve the data stored therein. In some embodiments, the reports are generated based on the electronic resources identified by the analyzer 230 and/or the user alignments generated by the alignment module 232. In some embodiments, the reporting module 236 is coupled directly to the analyzer 230 or recommender 234 to receive the data describing these resources, and to the alignment module 232 or recommender 234 to receive the user alignments. In other embodiments, the reporting module 236 may retrieve this data from a data store, such as the data store 206.

Additional structure and functionality of the system 100 are further described below with reference to FIGS. 3-11.

Example Methods

Figure 3:
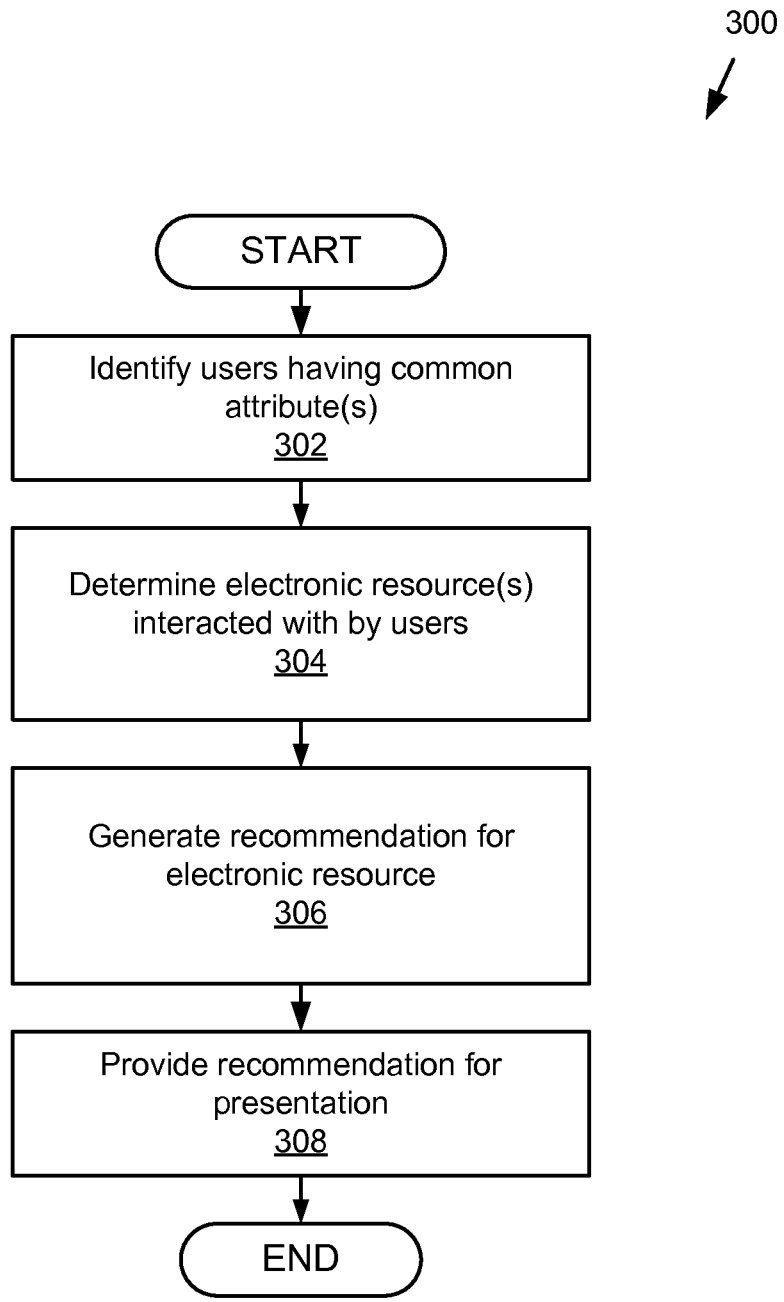
FIG. 3 is a flowchart of an example method for automatically generating a recommendation for an electronic training resource.

FIG. 3 describes an example method 300 for automatically generating a recommendation for an electronic training resource. The method 300 begins by identifying 302 a plurality of users having one or more attributes in common and then determining 304 one or more electronic resources that have been interacted with by these users. The one or more common attributes used to identify the users may include any attribute. In some embodiments, the one or more attributes may be common between the users and a target user to which the one or more resources are to be recommended. In some embodiments, the analyzer 230 can perform the operations in blocks 302 and 304. For example, the analyzer 230 may determine users having one or more attributes in common (e.g., by querying a data store) and analyze interaction data (e.g., retrieved from a data store) to determine which resources these users have interacted with.

In some embodiments, the one or more electronic resources may be determined based on their content, their popularity, user interaction with the resources, their effectiveness in helping users develop or improve, and/or other criteria. For instance, the analyzer 230 may analyze the assessment and/or achievement data associated with the users, along with the interaction data describing the electronic resources that the users have interacted with, to advantageously identify electronic resources that have been effective in assisting the users to improve in a particular area for recommendation to a target user who is struggling in that area.

In some embodiments, the method 300 may be initialized by receiving a request for a resource recommendation. For example, the request may be received from a client device 124 or another entity of the system 100. A user, for instance, may submit a request for resource recommendation via an interface associated with the application engine 104. In other embodiments, the method 300 may self-initialize (e.g., at regular intervals), or may be initialized by another component of the server 102.

Next, the method 300 generates 306 a recommendation for the one or more electronic resources identified in block 304. In some embodiments, the recommendation may be generated for any user including a user that requested it, a user specified by another user, a user automatically identified by the system 100 (e.g., the application engine 104) as needing additional instruction, etc. The method 300 continues by providing 308 the recommendation for presentation. To provide the recommendation, recommender 234, in some embodiments, may transmit the recommendation via the network 120 to a client device 124 of a user for presentation. The method 300 then terminates. The method 300 provides numerous advantages including, but not limited to, recommending effective electronic resources that are personalized to the needs of a user.

Figure 4:
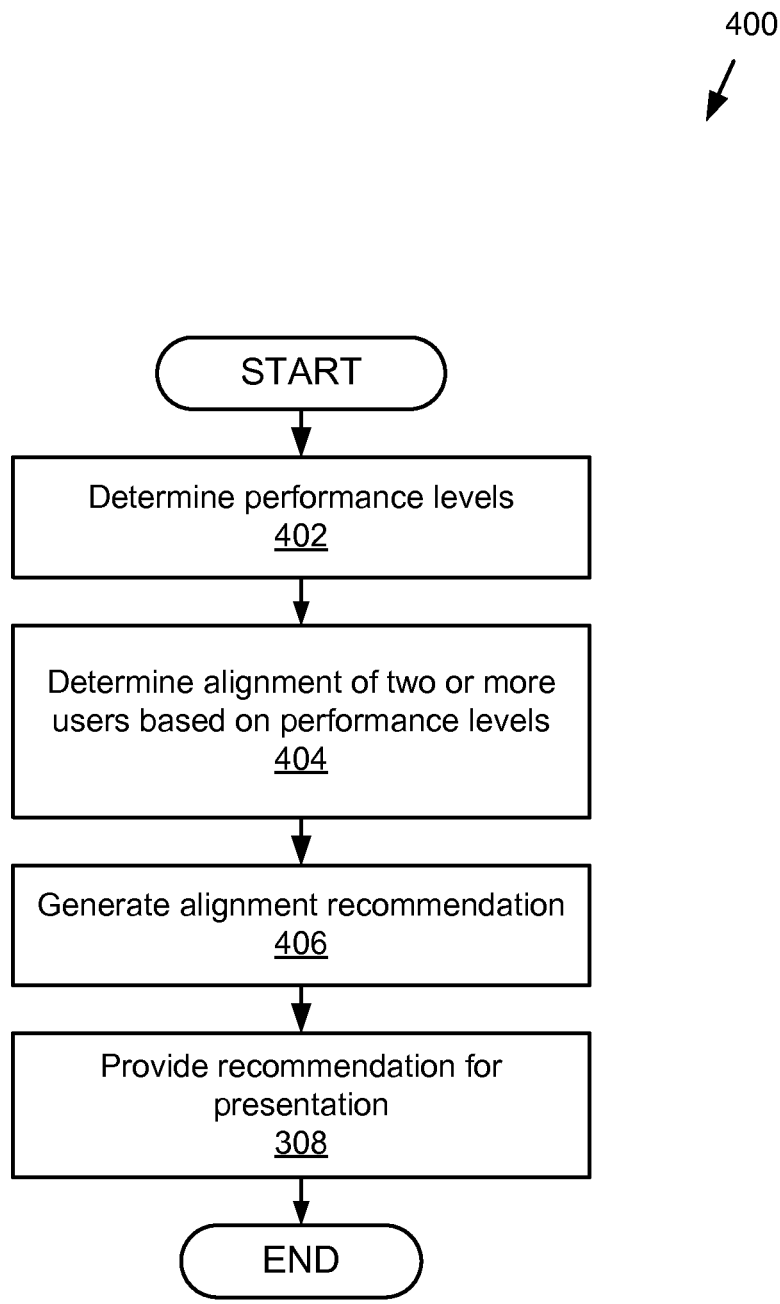
FIG. 4 is a flowchart of an example method for automatically generating a recommendation for a user alignment based on performance level.

FIG. 4 describes an example method 400 for automatically generating a recommendation for a user alignment based on performance level. The method 400 begins by determining 402 performance levels of a plurality of users and determining 404 an alignment of two or more of these users based on the performance levels. In some embodiments, the performance levels may be determined by the assessment module 228 or reflected by the assessment data and achievement data stored in the assessment data store 166 and achievement data store 160, respectively, and the alignment may be determined by the alignment module 232.

By way of example, a user alignment may align one or more users with high performance levels relative to an applicable standard and one or more users with low performance levels relative to the same or an associated standard to provide mentoring for the one or more underperforming users. For example, the alignment module 232 may determine, based on assessment data, achievement data, and standards data, which teachers are highly proficient relative to various standards and which teachers are poorly proficient relative to those standards, and may align the highly proficient teachers to be mentors to the poorly proficient teachers. In some embodiments, the method 400 may also receive and store video of the highly proficient teachers demonstrating best practices for recommendation to the poorly proficient teachers by the recommender 234. In another example, the user alignment may align two or more users whose performance levels meet or exceed an applicable standard, for example, to form a leadership or mentors group. Conversely, two or more users with low performance levels may be aligned for training, collaboration, and support.

The method 400 may, in some embodiments, begin responsive to receiving a request for a user alignment. For example, the request may be received from a client device 124 or another entity of the system 100. A user, for instance, may implicitly or explicitly request the user alignment via an interface associated with the application engine 104. In other embodiments, the method 400 may self-initialize (e.g., at regular intervals), or may be initialized by another component of the server 102.

Next, the method 400 generates 406, based on the user alignment, an alignment recommendation suggesting a social graph connection between the two or more users in the social graph 208, and provides 308 the recommendation for presentation in a manner similar or the same as that discussed above with reference to FIG. 3. In some embodiments, the recommender 234 may perform the operations described in blocks 406 and 308, in cooperation with other elements of the server 102 and the system 100. The method 400 is then complete and ends.

In some embodiments, various operations of the methods 300 and 400 may be combined to connect users and recommend pertinent resources to those users for them to consume and collaborate on. For instance, the recommender 234 may generate a recommendation that includes a user alignment of two or more users and as well as content for those users to consume and collaborate on. For example, two or more users may be aligned and recommended an electronic resource that is pertinent to their alignment. For instance, in a mentor alignment, the electronic resource demonstrate the best practices of the mentor, may be an instructional video that has been effective in helping other mentees with similar deficiencies improve, etc. Based on the user alignment, the users can connect via the social network module 224, interactively and collaborative consume the content using the functionality of the content module 222 and the social network module 224.

Figure 5A:
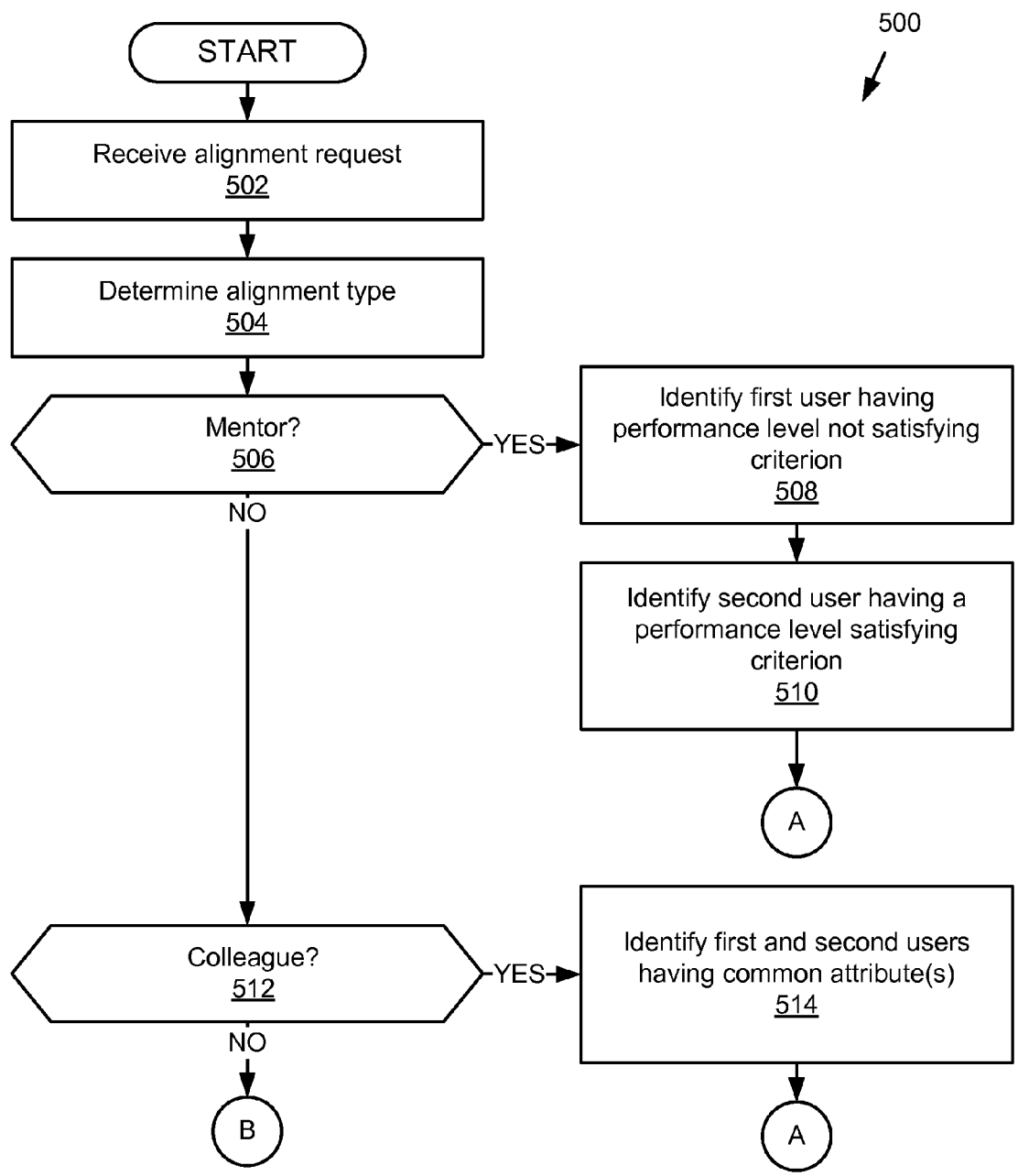
FIGS. 5A-B are flowcharts of an example method for automatically generating a recommendation for a user alignment based on an alignment type.
Figure 5B:
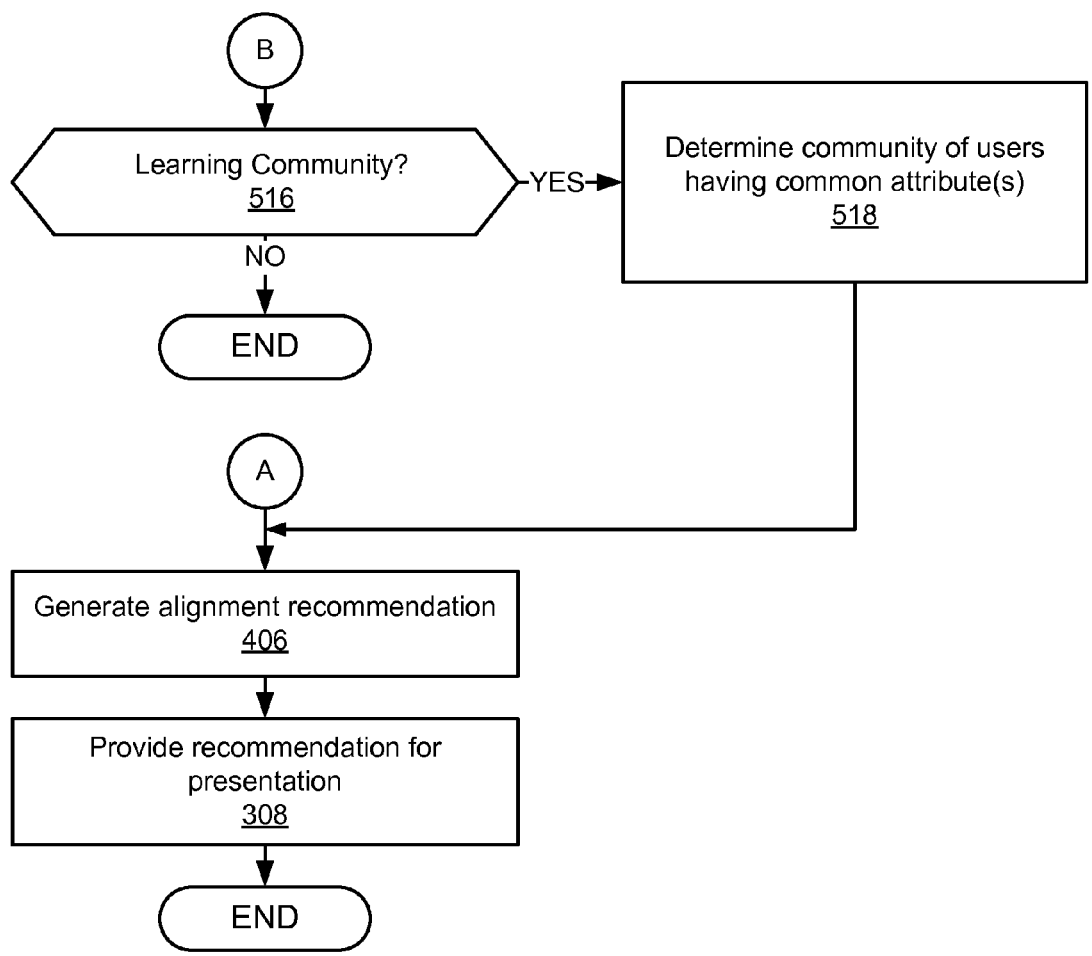

FIGS. 5A and 5B describe an example method 500 for automatically generating a recommendation for a user alignment based on an alignment type. As depicted in FIGS. 5A and 5B, the method 500 includes blocks that are the same as or substantially similar to the blocks of the methods 300 and 400. For convenience and ease of understanding, those blocks have the same reference numerals and perform the same or substantially similar functions, and their description will not be repeated in full here.

The method 500 begins by receiving 502 an alignment request. In some embodiments, the alignment request may be received from a client device 124 of a user on the user's own behalf. In other embodiments, the alignment request may be received from a client device 124 of a user on behalf of another user or users. In yet other embodiments, the method 500 may begin automatically without receipt of an alignment request. The alignment module 232, the recommender 234, or another module of the server 102 (such as a request handler (not shown)) may receive the alignment request.

Next, the method 500 determines 504 the alignment type and generates the user alignment based thereon. If, in block 506, the method 500 determines the alignment to be a mentor alignment, the method 500 identifies 508, as the mentee, a first user that has a performance level that does not satisfy a specific criterion. The performance level may be determined in advance or at the time block 508 is processed. The specific criterion may be tied to a standard as discussed elsewhere herein. The criterion may be predetermined or may be determined at the time the user alignment is being generated.

The method 500 then identifies 510, as the mentor, a second user having one or more attributes in the common with the first user and a performance level that satisfies a specific criterion. The specific criterion for the first user and the second user may be the same criterion or a different criterion. For instance, the mentor may be required to have a high proficiency rating relative to a given standard and the mentee may be required to have a poor proficiency to that same standard; or the mentor may be required to have a high proficiency rating relative to a more demanding standard while the mentee may be required to have a poor proficiency rating relative to a less demanding standard. By way of further example, based on an assessment of the first user's performance relative to a given academic standard, the alignment module 232 may use that standard as the criterion for determining the second user based on that user's performance.

As example of mentor alignment, a user may be a teacher, may have a large percentage of students who speak English as a second language, may be struggling to teach those students effectively based on the assessment data for the teacher and/or achievement data of the students. The user alignment may align that teacher with another teacher who has or has had a similar mix of students and has been highly proficient in teaching them based on the assessment and/or achievement data applicable to him/her.

In addition to identifying the first and second users based on performance levels, the method 500 may also use other attributes associated with the users to identify them. For example, the method 500 may base the identification of the first and second users on one or more attributes that are common or compatible between them.

If, the method 500 determines, in block 512, the alignment to be a colleague alignment, the method 500 identifies 514 a first and a second user that are connected by at least one common or compatible attribute. If the method 500 determines, in block 516, the alignment to be a learning community alignment, the method 500 determines 518, as a community of users, three or more users that share one or more compatible or common attributes.

As discussed above with reference to at least the social graph 208, a common or compatible attribute that may connect the users of a mentor alignment, colleague alignment, or a learning community alignment may include, but are limited to, a demographic, an assessment, an achievement, a standard, a user profile attribute, a content interaction, a combination of the foregoing, etc. In some embodiments, the alignment module 232 determines the alignment type in blocks 504, 506, 512, and 516, generates the alignment in blocks 508 and 510, 514, or 518, and provides the alignment to the recommender 234 for the recommender 234 to use to generate the recommendation. In other embodiments, the social network module 224, the recommender 234, a request handler (e.g., a component of the application engine 104, such as a request handler, that includes routines for processing requests (not shown)), or another module of the application engine 104 made the determination in blocks 504, 506, 512, and 516, and signal the alignment module 232 to generate the alignment in blocks 508 and 510, 514, or 518 and provide it to the recommender 234. Other configurations are also contemplated.

The method 500 continues by generating 406 an alignment recommendation in a manner substantially similar to or the same as that discussed above with reference to FIG. 4. In particular, the alignment recommendation may include a recommendation for a social graph connection between the users of the mentor alignment identified in blocks 508 and 510, between the users of the colleague alignment in block 514, or between each of the users of the learning community identified in block 518. The method 500 then provides 308 the recommendation for presentation in a manner similar to or the same as discussed above with reference to FIG. 3, and terminates.

The methods 400 and 500 boast numerous advantages including aligning users aligning users who are struggling with users who can provide mentorship and support, aligning users who share common attributes into a learning community so they can collaborate on various aspects of their own development or the development of those they instruct or oversee, helping users discover others users who share common goals, can provide mentoring, or with which they can collaborate with. This, in turn, can increase user engagement and interaction, and ultimately can help users to improve their effectiveness.

Figure 6:
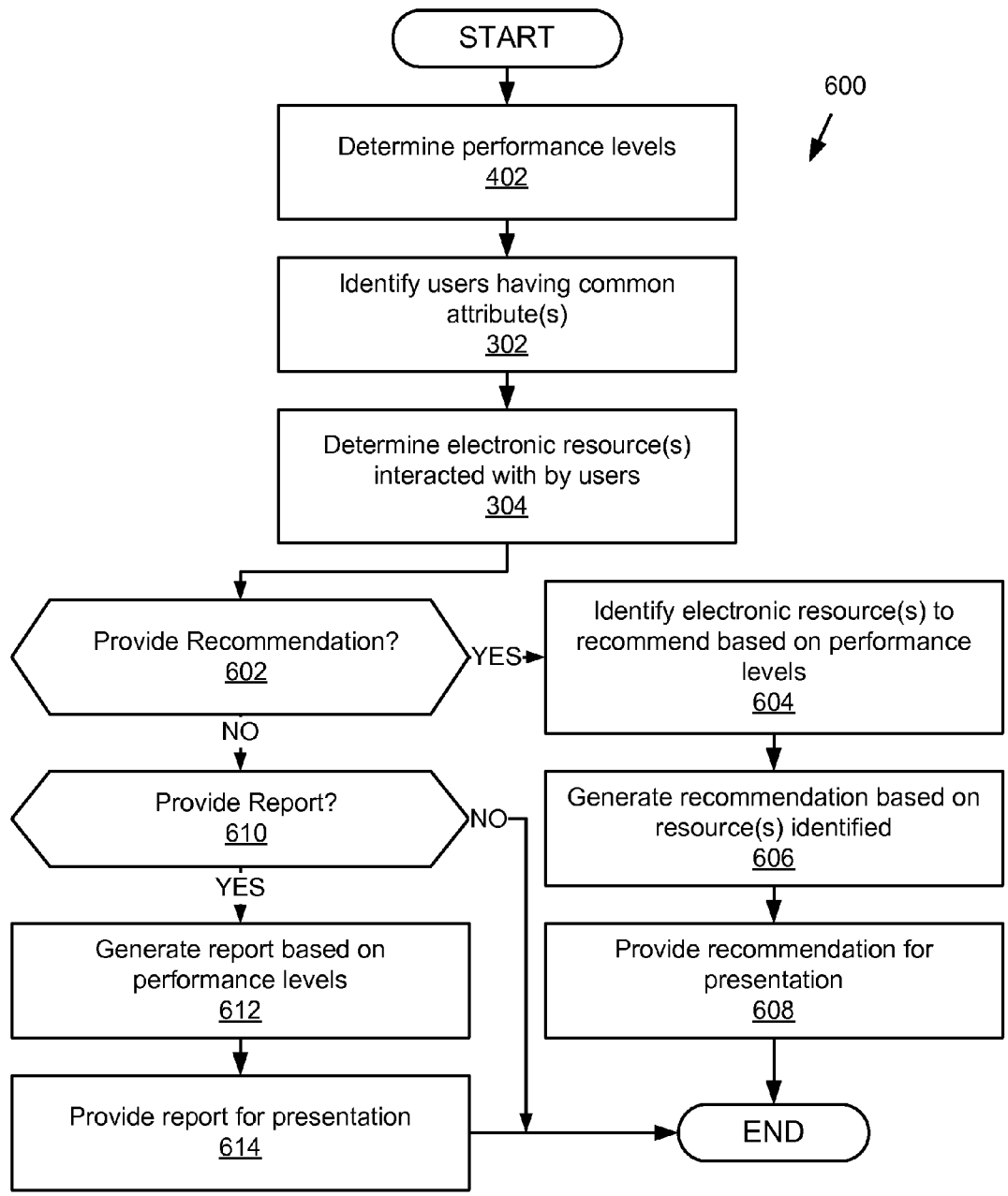
FIG. 6 is flowchart of an example method for automatically generating a recommendation for an electronic training resource suited to a user or a report describing the effectiveness of electronic resources.

FIG. 6 describes an example method 600 for automatically generating a recommendation for an electronic training resource suited to a user or a report describing the effectiveness of electronic resources. As depicted in FIG. 6, the method 600 includes blocks that are the same as or substantially similar to the blocks of the methods 300 and 400. For convenience and ease of understanding, those blocks have the same reference numerals and perform the same or substantially similar functions, and their description will not be repeated in full here.

The method 600 begins by determining 402 performance levels of the plurality of users in a manner similar to or the same as that discussed above with reference to FIG. 4, for example. Next, the method 600 identifies 302 two or more users of the plurality users that have one or more attributes in common, and determines 304 one or more electronic resources that have been interacted with by the two or more users, in a manner similar to or the same as that discussed above with reference to least FIG. 3, for example. In some embodiments, the method 600 performs the operations in block 302 and 304 responsive to receiving a request/instruction. In other embodiments, the method 600 automatically performs the operations in blocks 302 and 304. For example, recommendations and reports may automatically be generated by the method 600 and provided periodically to the users via electronic message (e.g., email, text message, instant message, etc.). In another example, a user may expressly request a recommendation or report be provided via an associated user.

The method 600 continues by determining whether to provide a recommendation or a report in blocks 602 and 610, respectively. The determination in blocks may be based on a request for a recommendation or report received from a client device 124 of a user or may be based on a predefined setting. In some embodiments, the content module 222 or request handler (not shown) may perform the operations of blocks 602 and 610. For example, if the content module 222 or request handler determines to provide a recommendation, it can signal the analyzer 230 to identify the electronic training resource(s) in block 604, and if the content module 222 or request handler determines to provide a report, it can signal the reporting module 236 to generate the report in block 612. In other embodiments, the recommender 234 and reporting module 236 may perform the operations of blocks 602 and 610, respectively. Other configurations are also contemplated.

If the method 600 determines 602 to provide a recommendation, the method 600 identifies 604, from the one or more electronic resources determined in block 304, at least one electronic training resource to recommend based on the assessment and/or achievement data (e.g., performance levels) corresponding to the two or more users identified in block 302. In some embodiments, the analyzer 230 identifies the electronic training resource(s) to recommend. The method 600 then generates 606 a recommendation based on the electronic training resource(s) identified in block 604 and provides 608 the recommendation for presentation. For example, the recommender 234 may generate the recommendation and transmit it, via the communication unit 212 and the network 120, to a client device 124 of a user 130 requesting it or designated to receive it.

Alternatively, if the method 600 determines 610 to provide a report, the method 600 generates 612 the report based at least on the assessment and/or achievement data (e.g., performance levels) of the two or more users identified in block 402 and provides 614 the report for presentation to a user 130. A non-limiting example of a report that may be provided is discussed below with reference to at least FIG. 11.

Figure 7:
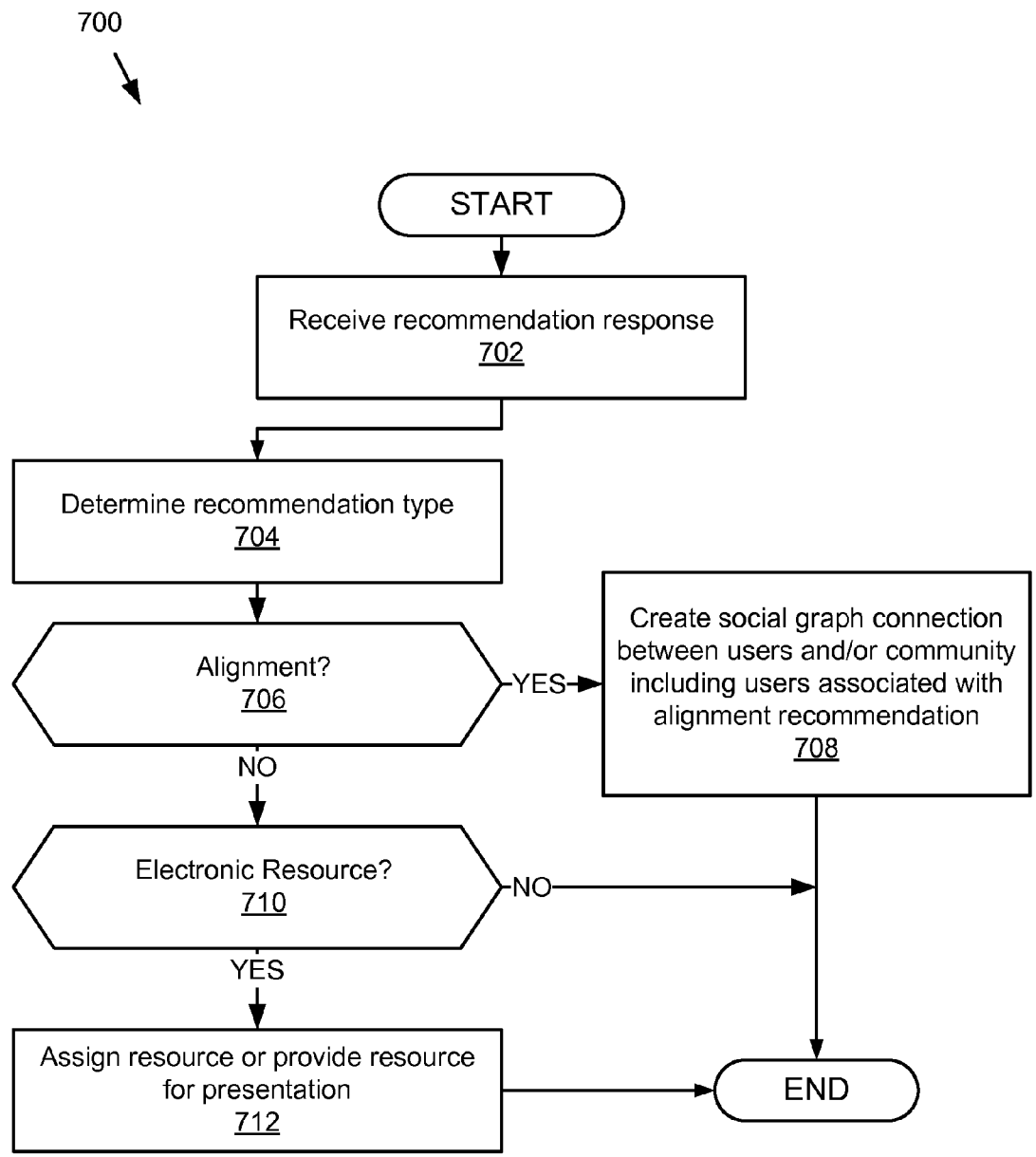
FIG. 7 is a flowchart of an example method for creating a social graph connection based on an alignment recommendation or assigning or providing a recommended electronic training resource.

FIG. 7 describes an example method 700 for creating a social graph connection based on an alignment recommendation or assigning or providing a recommended electronic training resource. The method 700 begins by receiving 702 a recommendation response. In some embodiments, the recommendation response is received in reply to a recommendation having been sent to a client device 124 of a user 130, such as the recommendations described above with reference to methods 300, 400, 500, 600, and/or 900. In these embodiments, the method 700 may be a continuation of these methods 300, 400, 500, 600, and/or 900.

The method 700 then determines 704 what type of recommendation the recommendation response is based on, and if, in block 706, the type of recommendation is determined to be an alignment, the method 700 creates 708 a social graph connection between the two or more users associated with the recommendation. In some embodiments, if an alignment recommendation was provided, such as a mentor alignment recommendation, a colleague alignment recommendation, or learning community alignment recommendation, the graphing module 226 can update the social graph 208 with a social graph connection between the users associated with that recommendation.

Alternatively, if the method 700 determines 710 the recommendation type to be an electronic training resource, the method 700, in block 712, assigns the resource or provides the resource for presentation. In some embodiments, a request handler (not shown) may receive the recommendation response in block 702 and may further signal one or more components of the application engine 104 to perform the operations of blocks 704, 706, and 710. In some embodiments, a recommendation may be a recommendation to a supervisor of a user suggesting that an electronic training resource be assigned to the user. In these embodiments, the recommendation response may reflect the supervisor's acceptance of the recommendation and the method 700, in block 712, may assign the electronic training resource to the user for completion. For instance, the assessment module 228 or content module 222 may assign the resource by updating the user's profile in a data store, such as the data store 206, with an entry reflecting the assignment. In other embodiments, the recommendation may be a recommendation to a user to consume an electronic training resource, such as a resource that has been identified as effective to assist the user with his/her professional development in a particular area. In these embodiments, the method 700 may assign, e.g., via the assessment module 228 or the content module 222, the resource for completion at a later time or may provide the resource, e.g., via the content module 222, to a user device of the user 130 for presentation. The method 700 then terminates.

Figure 8:
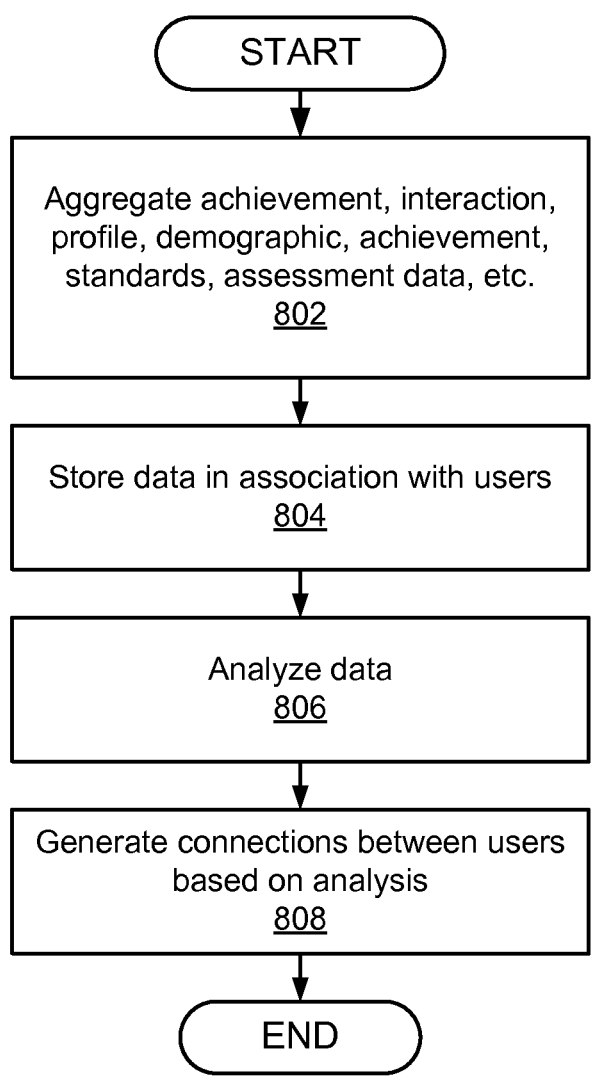
FIG. 8 is a flowchart of an example method for aggregating data and automatically generating social graph connections based thereon.

FIG. 8 describes an example method 800 for aggregating data and automatically generating social graph connections based thereon. The method 800 begins by aggregating demographics data, content data, interaction data, standards data, achievement data, assessment data, and profile data, and storing 804 the data in association with the users of the application engine 104. The data may be aggregated from data stores 112, 140, 150, 160, and 166, from client devices 124, or may be received or generated by performing the various operations discussed herein. Next, the method 800 analyzes 806 the aggregated data to determine how the users of the application engine 104 are performing, and generates 808 connections between the users of the application engine 104 based on this analysis. For example, the alignment module 232 may analyze the aggregated data and generate user alignments, such as mentor, colleague, and learning community alignments, based thereon, and the graphing module 226 may receive these user alignments (e.g., from the alignment module 232, the data store 206, etc.) and define social graph connections between the users associated therewith.

Figure 9:
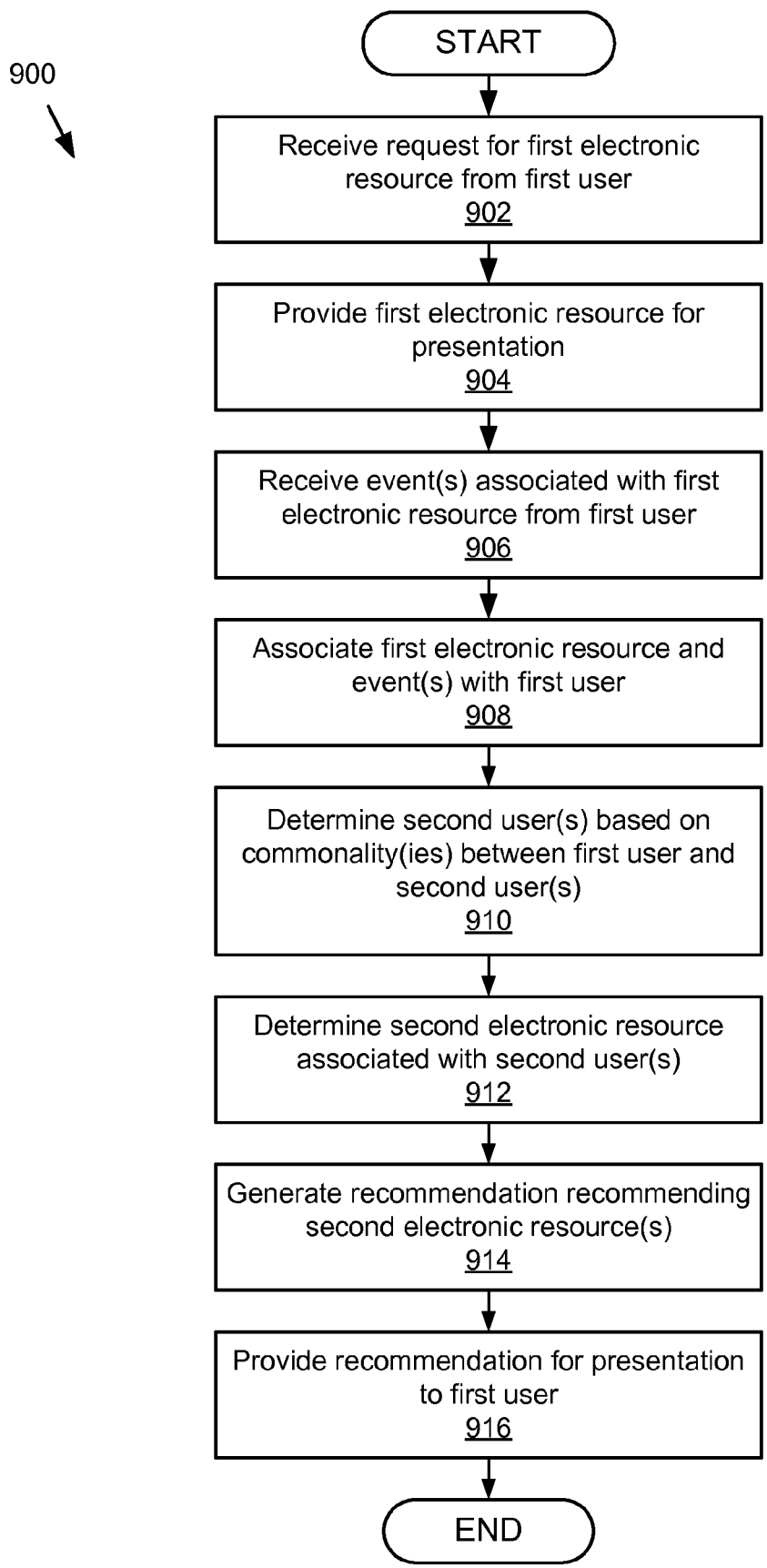
FIG. 9 is a flowchart of an example method for recommending an electronic training resource for a first user based on a commonality between a second user and the first user.

FIG. 9 describes an example method 900 for recommending an electronic training resource for a first user based on a commonality between a second user and the first user. The method 900 begins by receiving 902 a request for a first electronic training resource from the first user and providing 904 the resource to a client device 124 of the first user for presentation. In some embodiments, a request handler (not shown) receives the request and signals the content module 222 to provide the resource. In other embodiments, the content module 222 receives the request and provides the resource. The method 900 then receives 906 one or more events associated with the electronic training resource from the first user. In some embodiments, the events reflect the first user's interactions with the electronic training resource on the first user's client device 124, such as how long the user interacted with the resource, or portions of the resource the user interacted with, whether the user completely consumed the resource, etc. Upon receiving the events, the method 900 associates 908 these events with the first user. In some embodiments, the content module 222 receives the events and makes these associations, for example, by analyzing and storing them, along with any analysis, in the data store 206 in association with the first user.

Next, the method 900 determines 910 one or more second users based on one or more commonalties (e.g., common attributes) between the first user and the one or more second users, and determines 912 at least one second electronic training resource associated with the second users. For example, in educational setting, a commonality between the first and second users may be a subject, such as English, taught by the first and second user, and the second electronic training resource may be an online video that the second users interacted with/consumed to improve their effectiveness in teaching students on how to diagram sentences. In some embodiments, the analyzer 230 determines the one or more second users and interacts with or uses data stored by the content module 222 to determine the second electronic training resource(s).

The method 900 continues by generating 914 a recommendation recommending the second electronic training resource(s) to the first user for consumption and providing 916 the recommendation for presentation to the first user. In some embodiments, the recommender 234 generates the recommendation based on the information determined in block 910 and 912, and provides the recommendation by transmitting it via the network 120 to a client device 124 of the first user. The method 900 then terminates.

Figure 10:
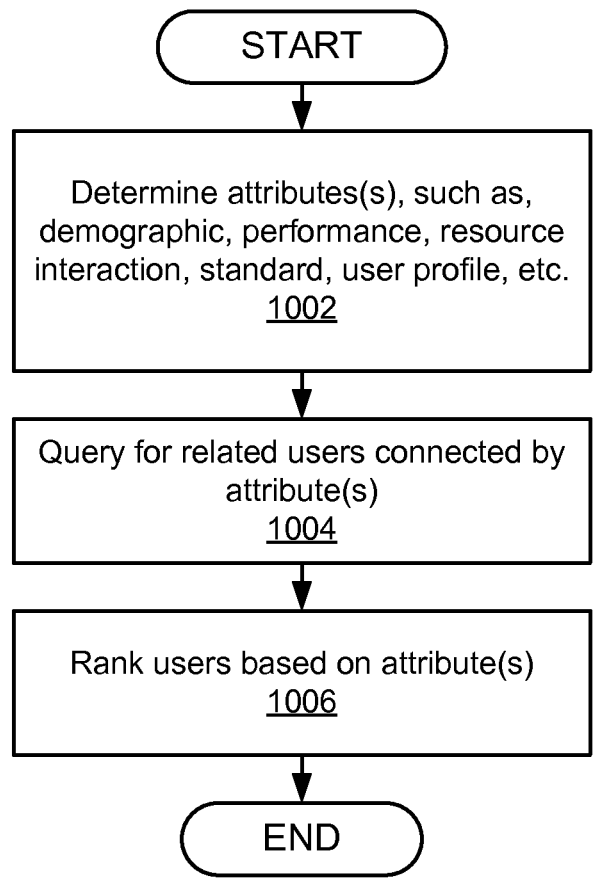
FIG. 10 is a flowchart of an example method for identifying and ranking related users.

FIG. 10 describes an example method 1000 for identifying related users and ranking them based on social graph connections. The method 1000 begins by determining 1002 one or more attributes, such as a demographic, performance level, resource interaction, a standard, a user profile attribute, etc., and querying 1004 for related users based on the one or more attributes. The method 1000 then ranks 1006 the users identified in block 1004 based on the one or more attributes. For example, the method 1000 may rank the users based on number of attributes shared, the similarity of the attributes, the strength of the attributes, or the like. In some embodiments, the alignment module 232 performs the ranking of the users and provides a ranked list of users to the recommender 234 for use in generating a user alignment recommendation. The method 1000 is then complete and ends.

It should be understood that the embodiments described in this disclosure are provided by way of illustration and example and should not be considered limiting, and that other variations and combinations of these embodiments are contemplated and within the scope of the present disclosure. Moreover, unless stated otherwise, the various different embodiments described herein should not be considered as being mutually exclusive and can be integrated in various ways, or may be further divided into various discrete devices, components, and methods. For example, various operations of the methods 300 or 400 may be expanded upon by operations included in one or more of methods 500-1000, or by concatenating and/or substituting various blocks from these methods, all of which are encompassed by the present disclosure. Further, it should be understood that, in some instances, the methods 300-1000 may be iterated more than one time to produce various results. Additionally, the usage of the terms first, second, etc., in various places in this disclosure does not necessarily imply a specific order or rank, and is used in some cases to help the reader discern between various objects, items, elements, etc.

Example User Interface

Referring now to FIG. 11, an example report 1100 is described. It should be understood that the report illustrated in FIG. 11 is provided merely by way of example, and that other reports may be generated and displayed by the client application 126 to allow the server 102 to present information to one or more users. For example, various user interfaces may be produced to display reports and statistics, display dialogs, set parameters and settings, provide resource and user alignment recommendations, send electronic communications, view, listen to, and/or interact with the electronic resources provided by the professional development service, etc.

In the depicted embodiment, example report 1100 is displayed via a user interface including various interactive user interface elements. In this particular example, the example report 1100 includes the performance of the teachers of a school relative to criteria (e.g., standards) that have been set along with a summary of the professional development activities performed by those teachers and an indication about effectiveness of those activities. The example report 1100 interface includes a segment selector 1102; a time period selector 1104; a view details link 1106; a compliance region 1108, and a non-compliance region 1118. The segment selector 1102 is a user interface element for selecting a teacher segment. For example, as depicted, the segment of "4th Grade Teachers" has been selected, and as a result, information about this segment of teachers is displayed in the compliance and non-compliance regions 1108 and 1118. In an another example, if the user selects another segment of teachers, such as all of the teachers of the school or the teachers of another grade (e.g., $5^{th}$ grade), the compliance and non-compliance regions 1108 and 1118 would be updated with corresponding information about that segment of teachers.

The time period selector 1104 is the user interface for selecting a time period for the report. In some embodiments, the report may be limited to including information pertaining to certain date ranges. For example, as depicted, the report 1100 is configured to display results for the fall semester of year 2011. Any other date ranges or time periods are also contemplated. In other embodiments, the evaluation period selector 1104 may be unset or set to include all time periods, and the report may display information covering all time periods.

The view details link 1106 is a user-selectable interface element that provides the user interacting with the report 1100 the option to view additional information about the selected segment of teachers. In some embodiments, selecting the view details link 1106 displays a hidden field/region including detailed information about those teachers. In other embodiments, selecting the view details link 1106 displays a pop-up or additional dialog including detailed information about the teachers. The detailed information may include any information stored and/or aggregated about the teachers, such as demographic information, standards that apply to teachers, performance levels, profile information, student information, classroom information, etc.

The compliance region 1108 is a content region for displaying information about the teachers determined to be meeting the various standards applicable to them. The compliance region 1108 may include a view details link 1110, used resource region 1112, and a suggested resources region 1114. The view details link 1110 is a user-selectable interface element that provides a user interacting with the report 1100 the option to view compliance information. In some embodiments, selecting the view details link 1110 displays a hidden field including the compliance information. In other embodiments, selecting the view details link 1110 displays a pop-up dialog including the compliance information. The compliance information may describe the teachers' performance relative to the job criteria (e.g., standards). This information may include data contrasting the complaint teachers with non-compliant teachers, graphs showing overall compliance of a subject, grade, school, district, etc., graphs showing performance trend lines over time, an indication of the teachers' effectiveness, both individually and as a group, and the like.

The used resource region 1112 is a content region for displaying the electronic resources consumed by the teachers who have been deemed as compliant relative to the job criteria (e.g., standards). In some embodiments, the electronic resources reflect the best or most effective electronic resources, as determined by the analyzer 230. The used resource region 1112 may include descriptive information about the resources, including metadata such as who viewed the resources, the authors of the resources, the resource titles, a media player window for previewing audio/video-based resources, etc.

The suggested resources region 1114 includes recommendations for additional electronic resources that can be assigned by the user interacting with the report 1100 to one or more of the complaint teachers. The additional electronic resources may be recommended by the recommender 234 in cooperation with analyzer 230 based on their effectiveness on helping other teachers with similar attributes to continue to improve or to maintain a high level of proficiency in various areas and with various skills and techniques. In some embodiments, the suggested resources region 1114 includes an assignment selector 1116 for assigning one or more of the recommended electronic resources to one or more of the compliant teachers. For example, upon selecting a teacher or teachers with the assignment selector 1116, the client application 126 generates and sends an assignment request to the assessment module 228 requesting the electronic resource be assigned for completion to that teacher(s). The assessment module 228 may then track whether the teachers completed the assignment and can provide an indication thereof in the assessments generated by it. In some embodiments, assignment criteria may also be specified, such as a due date, when assigning the recommended resources using various interface elements (not shown), and the assessment module 228 may use the assignment criteria to determine whether the assignment was completed successfully.

The non-compliance region 1118 is a content region for displaying information about the teachers determined not to be meeting the standards that apply to them. The non-compliance region 1118 may include a view details link 1120, used resource region 1122, and a suggested resources region 1124. The view details link 1120 is a user-selectable interface element that provides a user interacting with the report 1100 the option to view non-compliance information. In some embodiments, selecting the view details link 1110 displays a hidden field including the non-compliance information. In other embodiments, selecting the view details link 1106 displays a pop-up for additional dialogue including the non-compliance information. The non-compliance information may describe how the teachers are performing relative to the applicable standards. This information may include data contrasting the non-complaint teachers with compliant teachers, graphs showing overall compliance of a subject, grade, school, district, etc., graphs showing performance trend lines over time, an indication of the teachers' effectiveness, both individually and as a group, and the like.

The used resource region 1122 is a content region for displaying the electronic resources consumed by the teachers who have been deemed as being non-compliant (e.g., by the assessment data). In some embodiments, the electronic resources reflect the most popular electronic resources used by the non-compliant teachers, as determined by the analyzer 230, or the most popular resources used by the compliant teachers with students of similar demographics to the non-compliant users, thereby implying that those resources have been successful for the compliant teachers and could yield likewise results for the non-compliant teachers. The used resource region 1122 may include descriptive information about the resources, including metadata such as who viewed the resources, the authors of the resources, the resource titles, a media player window for previewing audio/video-based resources, etc.

The suggested resources region 1124 includes recommendations for electronic resources that can be assigned by the user interacting with the report 1100 to one or more of the non-complaint teachers. The recommendations for these electronic resources may be generated by the recommender 234 in cooperation with the analyzer 230 based on effectiveness of the resources in helping other teachers with similar attributes to meet the standard(s) and become compliant. The suggested resources region 1124 may, in some embodiments, include an assignment selector 1126 for assigning one or more of the electronic sources described in the suggested resources region 1124 to one or more of the non-compliant teachers. The functionality of the assignment selector 1126 is the same or substantially similar to the assignment selector 1116 and will not be described again here. While not depicted, in some embodiments, a region or dialog for providing recommendations for user alignments, such as mentor, colleague, and learning community alignments, for the compliant and non-compliant teachers may also be included, and may be accepted by the user viewing the report.

Various embodiments for automatically determining user alignments and recommendations for electronic resources have been described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present disclosure can take the form of an entirely hardware embodiment, an entirely software embodiment or an embodiment containing both hardware and software elements. In some embodiments, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   determining, using one or more computing devices, a performance level for each of two or more users of an educational platform, the performance level for each user of the two or more users reflecting how the user is performing in a capacity relative to a predetermined standard;
   determining, the one or more computing devices, an alignment between the two or more users based on the performance level of each of the two or more users;
   defining, using the one or more computing devices, a social graph connection between the two or more users in a social graph of the educational platform, the social graph connection reflecting the alignment of the two or more users based on the performance level of each of the two or more users;
   determining, using the one or more computing devices, an electronic training resource using data showing the electronic training resource has previously been effective at providing instruction related to the predetermined standard; and
   facilitating, using the one or more computing devices, collaboration on the electronic training resource between the two or more users aligned by the social graph connection on the educational platform to help at least one user of the two or more users develop relative to the predetermined standard.

2. The computer-implemented method of claim 1, wherein the determining of the alignment between the two or more users includes:
   identifying a first user having a performance level that does not satisfy a first criterion; and
   identifying, as a mentor for the first user, a second user having a performance level satisfying a second criterion, wherein the first criterion and the second criterion are one of a same criterion or a different criterion.

3. The computer-implemented method of claim 1, wherein the determining of the alignment between the two or more users includes:
   identifying, as a learning community, three or more users of the educational platform based on the performance level of each of the three or more users and an attribute common or compatible between the three or more users.

4. The computer-implemented method of claim 1, comprising:
prior to the defining of the social graph connection between the two or more users in the social graph of the educational platform, generating, using the one or more computing devices, a recommendation recommending the social graph connection;
providing, using the one or more computing devices, the recommendation to a user for presentation; and
receiving, using the one or more computing devices, a recommendation response from the user responsive to the providing of the recommendation, the social graph connection being defined responsive to the receiving of the recommendation response.

5. The computer-implemented method of claim 2, comprising:
receiving, using the one or more computing devices, a digital video of the mentor demonstrating a best practice related to the predetermined standard, wherein the electronic training resource includes the digital video and the facilitating of the collaboration on the electronic training resource includes facilitating communication between the mentor and the first user about the best practice demonstrated by the digital video.

6. The computer-implemented method of claim 1, comprising:
aggregating, using the one or more computing devices, data including one or more of achievement data, profile data, demographics data, standards data, and assessment data, wherein the performance level for each of the two or more users is determined based at least in part on the data.

7. The computer-implemented method of claim 1, wherein the determining the electronic training resource further comprises:
analyzing interaction data to determine the electronic training resource as having been interacted with by a set of users of the electronic platform;
calculating a performance trend for the set of users based on one or more of assessment data and achievement data associated with the set of users, the performance trend showing an improvement relative to the predetermined standard and the set of users connected to at least one of the two or more users in the social graph based on a commonality; and
determining the electronic training resource to be effective at providing the instruction related to the predetermined standard based on the performance trend for the set of users.

8. A computer program product comprising a non-transitory computer-usable medium including instructions which, when executed by a computer, cause the computer to:
determine a performance level for each of two or more users of an educational platform, the performance level for each user of the two or more users reflecting how the user is performing in a capacity relative to a predetermined standard;
determine an alignment between the two or more users of the educational platform based on the performance level of each of the two or more users;
define a social graph connection between the two or more users in a social graph of the educational platform, the social graph connection reflecting the alignment of the two or more users based on the performance level of each of the two or more users;
determine an electronic training resource using data showing the electronic training resource has previously been effective at providing instruction related to the predetermined standard; and
facilitate collaboration on the electronic training resource between the two or more users aligned by the social graph connection on the educational platform to help at least one user of the two or more users develop relative to the predetermined standard.

9. The computer program product of claim 8, wherein to determine the alignment between the two or more users includes:
identifying a first user having a performance level that does not satisfy a first criterion; and
identifying, as a mentor for the first user, a second user having a performance level satisfying a second criterion, wherein the first criterion and the second criterion are one of a same criterion or a different criterion.

10. The computer program product of claim 8, wherein to determine the alignment between the two or more users includes:
identifying, as a learning community, three or more users of the educational platform based on the performance level of each of the three or more users and an attribute common or compatible between the three or more users.

11. The computer program product of claim 8, wherein the instructions further cause the computer to:
prior to defining the social graph connection between the two or more users in the social graph of the educational platform, generating a recommendation recommending the social graph connection;
provide the recommendation to a user for presentation; and
receive a recommendation response from the user responsive to the recommendation being provided, the social graph connection being defined responsive to the recommendation response being received.

12. The computer program product of claim 8, wherein the instructions further cause the computer to:
receive a digital video of the mentor demonstrating a best practice related to the predetermined standard, wherein the electronic training resource includes the digital video and to facilitate collaboration on the electronic training resource includes facilitating communication between the mentor and the first user about the best practice demonstrated by the digital video.

13. The computer program product of claim 8, wherein the instructions further cause the computer to:
aggregate data including one or more of achievement data, profile data, demographics data, standards data, and assessment data, wherein the performance level for each of the two or more users are determined based at least in part on the data.

14. The computer program product of claim 8, wherein to determine the electronic training resource further comprises:
analyzing interaction data to determine the electronic training resource as having been interacted with by a set of the users of the electronic platform;
calculating a performance trend for the set of users based on one or more of assessment data and achievement data associated with the set of users, the performance trend showing an improvement relative to the predetermined standard and the set of users connected to at least one of the two or more users in the social graph based on a commonality; and determining the electronic training resource to be effective at providing the instruction related to the predetermined standard based on the performance trend for the set of users.

15. A system comprising:

one or more processors;

an assessment module, executable by the one or more processors, to determine a performance level for each of two or more users of an educational platform, the performance level for each user of the two or more users reflecting how the user is performing in a capacity relative to a predetermined standard;

an alignment module, executable by the one or more processors, to determine an alignment between the two or more users of the educational platform based on the performance level of each of the two or more users;

a graphing module, executable by the one or more processors, to define, in a social graph, a social graph connection between the two or more users of the educational platform, the social graph connection reflecting the alignment of the two or more users based on the performance level of each of the two or more users;

an analyzer, executable by the one or more computing devices, to determine an electronic training resource using data showing the electronic training resource has previously been effective at providing instruction related to the predetermined standard; and a social network module, executable by the one or more processors, to facilitate collaboration on the electronic training resource between the two or more users aligned by the social graph connection on the educational platform to help at least one user of the two or more users develop relative to the predetermined standard.

16. The system of claim 15, wherein the alignment module is further configured to determine the alignment between the two or more of the users based on an alignment type.

17. The system of claim 15, wherein the alignment module is further configured to determine the alignment between the two or more users by identifying a first user having a performance level that does not satisfy a first criterion, and identifying, as a mentor for the first user, a second user having a performance level satisfying a second criterion, wherein the first criterion and the second criterion are one of a same criterion or a different criterion.

18. The system of claim 15, wherein the alignment module is further configured to determine the alignment between the two or more users by identifying, as a learning community, three or more users of the educational platform based on the performance level of each of the three or more users and an attribute common or compatible between the three or more users.

19. The system of claim 15, comprising:

a recommender, executable by the one or more processors, to generate a recommendation for the social graph connection between the two or more users in the social graph of the educational platform prior to the graphing module defining the social graph connection between the two or more users in the social graph; and a communication unit for sending and receiving data, wherein the recommender is coupled to the communication unit to provide the recommendation to the user for presentation and to receive a recommendation response from the user responsive to the recommendation being provided, and the graphing module is configured to define the social graph connection in the social graph responsive to the recommendation response being received.

20. The system of claim 19, wherein the recommender is coupled to receive the alignment from the alignment module or a data store, and the alignment module is coupled to receive the performance level for each of the two or more users from the assessment module or a data store.

21. The system of claim 15, comprising:

an aggregator, executable by the one or more processors, to aggregate data including one or more of achievement data, profile data, demographics data, standards data, and assessment data, wherein the assessment module is configured to determine the performance level for each of the two or more users based at least in part on the data.

22. The system of claim 15, wherein the analyzer is further configured to determine the electronic training resource by:

analyzing interaction data to determine the electronic training resource as having been interacted with by a set of users of the electronic platform;

calculating a performance trend for the set of users based on one or more of assessment data and achievement data associated with the set of users, the performance trend showing an improvement relative to the predetermined standard and the set of users connected to at least one of the two or more users in the social graph based on a commonality; and determining the electronic training resource to be effective at providing the instruction related to the predetermined standard based on the performance trend for the set of users.

23. The system of claim 15, further comprising:

a content module, executable by the one or more processors, to receive a digital video of the mentor demonstrating a best practice related to the predetermined standard, wherein the electronic training resource includes the digital video and to facilitate collaboration on the electronic training resource includes facilitating communication between the mentor and the first user about the best practice demonstrated by the digital video.

* * * * *